(12) United States Patent
Takaichi et al.

(10) Patent No.: US 10,361,432 B2
(45) Date of Patent: Jul. 23, 2019

(54) NON-AQUEOUS SECONDARY BATTERY

(71) Applicant: Maxell Holdings, Ltd., Otokuni-gun, Kyoto (JP)

(72) Inventors: Yuta Takaichi, Osaka (JP); Keisuke Kawabe, Osaka (JP); Yoshimi Hamatani, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 320 days.

(21) Appl. No.: 15/113,655

(22) PCT Filed: Jan. 23, 2015

(86) PCT No.: PCT/JP2015/051878
§ 371 (c)(1),
(2) Date: Jul. 22, 2016

(87) PCT Pub. No.: WO2015/111710
PCT Pub. Date: Jul. 30, 2015

(65) Prior Publication Data
US 2017/0005334 A1    Jan. 5, 2017

(30) Foreign Application Priority Data

Jan. 24, 2014  (JP) .................................. 2014-011043
Feb. 13, 2014  (JP) .................................. 2014-025370

(51) Int. Cl.
| H01M 4/525 | (2010.01) |
| H01M 4/36 | (2006.01) |
| H01M 4/131 | (2010.01) |
| H01M 4/505 | (2010.01) |
| H01M 4/587 | (2010.01) |
| H01M 10/052 | (2010.01) |
| H01M 2/16 | (2006.01) |
| H01M 4/38 | (2006.01) |
| H01M 4/62 | (2006.01) |
| H01M 4/02 | (2006.01) |
| H01M 10/0569 | (2010.01) |

(52) U.S. Cl.
CPC ........... *H01M 4/525* (2013.01); *H01M 2/166* (2013.01); *H01M 2/1653* (2013.01); *H01M 2/1686* (2013.01); *H01M 4/131* (2013.01); *H01M 4/364* (2013.01); *H01M 4/366* (2013.01); *H01M 4/386* (2013.01); *H01M 4/505* (2013.01); *H01M 4/587* (2013.01); *H01M 4/625* (2013.01); *H01M 10/052* (2013.01); *H01M 10/0569* (2013.01); *H01M 2004/021* (2013.01); *H01M 2300/0037* (2013.01); *Y02T 10/7011* (2013.01)

(58) Field of Classification Search
CPC ...... H01M 4/525; H01M 4/131; H01M 4/505; H01M 4/364; H01M 4/366; H01M 4/587; H01M 4/386; H01M 4/625; H01M 10/052; H01M 2/1653; H01M 2/166; H01M 2/1686; H01M 2004/021; Y02T 10/7011

See application file for complete search history.

(56) References Cited

U.S. PATENT DOCUMENTS

| 2003/0215711 A1 | 11/2003 | Aramata et al. |
| 2005/0233213 A1 | 10/2005 | Lee et al. |
| 2009/0029255 A1 | 1/2009 | Ohmori |
| 2012/0176089 A1 | 7/2012 | Hwang et al. |
| 2013/0260231 A1 | 10/2013 | Hua et al. |
| 2013/0344381 A1* | 12/2013 | Kawamoto ......... H01M 10/052 429/200 |
| 2014/0127574 A1 | 5/2014 | Ohmori |
| 2014/0234535 A1 | 8/2014 | Lee et al. |
| 2014/0234704 A1 | 8/2014 | Kamizori et al. |

FOREIGN PATENT DOCUMENTS

| JP | 2004-47404 A | 2/2004 |
| JP | 2005-259697 A | 9/2005 |
| JP | 2006-202647 A | 8/2006 |
| JP | 2007-165074 A | 6/2007 |
| JP | 2010-135338 A | 6/2010 |
| JP | 2010-232038 A | 10/2010 |
| JP | 2012-14998 A | 1/2012 |
| WO | WO 2012/014998 A1 | 2/2012 |
| WO | WO 2013/047747 A1 | 4/2013 |

OTHER PUBLICATIONS

Japanese Office Action, dated Jul. 26, 2018, for Japanese Application No. 2015-559137, with an English translation.
International Search Report issued in PCT/JP2015/051878, dated Mar. 17, 2015.

* cited by examiner

*Primary Examiner* — Laura Weiner
(74) *Attorney, Agent, or Firm* — Birch, Stewart, Kolasch & Birch, LLP

(57) ABSTRACT

A positive electrode mixture layer of a non-aqueous secondary battery of the present invention contains a first positive electrode active material and a second positive electrode active material each composed of a lithium-containing composite oxide represented by General Composition Formula (1): $Li_{1+y}MO_2$ (1). The first positive electrode active material contains Co, and the second positive electrode active material contains Co, Ni and Mn. The ratio of the first positive electrode active material to all positive electrode active materials contained in the positive electrode mixture layer is 20 mass % or more. The positive electrode mixture layer has a density of 3.4 g/cm³ or less. Further, a negative electrode mixture layer contains carbon-coated SiOx and graphite, or a conductive layer is formed on a surface of a positive electrode current collector.

4 Claims, 2 Drawing Sheets

NON-AQUEOUS SECONDARY BATTERY

TECHNICAL FIELD

The present invention relates to a non-aqueous secondary battery that has a high capacity and a long life and that is excellent in output characteristics.

BACKGROUND ART

Non-aqueous secondary batteries such as a lithium ion secondary battery are characterized by a high energy density and thus have been widely used as a power source for portable equipment such as a portable telephone and a notebook personal computer. Recently, large lithium-ion secondary batteries such as an electric car battery and a stationary storage battery also come into widespread use.

By the way, non-aqueous secondary batteries for use as a power source for a portable telephone and the like are desired to have a higher capacity, improved storage characteristics, and improved charge and discharge cycle characteristics, and to have excellent convenience. Particularly, the non-aqueous secondary batteries are required to have both a high capacity to extend the duration of devices to be used and large current characteristics that enable charge and discharge at large current.

In order to increase the capacity of non-aqueous secondary batteries, for example, materials such as silicon (Si) and tin (Sn) capable of absorbing and desorbing as much lithium (Li) as possible are gaining attention as negative electrode active materials, in place of carbonaceous materials such as graphite that have been adopted in conventional lithium-ion secondary batteries. Patent Documents 1 and 2 reported that especially a material represented by General Composition Formula $SiO_x$ having a configuration in which Si ultra-fine particles are dispersed in the matrix of $SiO_2$ have excellent load characteristics, in addition to the above characteristics.

Patent Document 3 discloses a positive electrode active material containing nickel (Ni), manganese (Mn), cobalt (Co), and another substituent element M in a specific ratio, wherein an atomic ratio of the substituent element M with respect to Ni, Mn and Co on the surface of the particle is larger than an average atomic ratio of the substituent element M with respect to Ni, Mn and Co in the entire particle. The positive electrode active material containing Ni as disclosed in Patent Document 3 has a larger capacity than $LiCoO_2$, and hence is expected to further increase the capacity of lithium-ion secondary batteries.

Meanwhile, in order to enhance large current characteristics of non-aqueous secondary batteries, the resistance of an electrode should be reduced and the diffusibility of lithium ions should be enhanced in an electrode mixture layer. However, when the porosity of the electrode mixture layer is increased to enhance the diffusibility of lithium ions in the electrode mixture layer, the contact resistance between a current collector and the electrode mixture layer or between constituent particles such as active materials in the electrode mixture layer becomes large, and the impedance of the electrode is increased. Hence, large current characteristics cannot be enhanced as expected.

In order to enhance such large current characteristics of non-aqueous secondary batteries, for example, Patent Document 4 discloses a configuration for reducing the contact resistance between the current collector and the electrode mixture layer, in which a conductive layer containing electron conductive carbon fine particles is formed on a current collector made of a metal foil that is used in a conventional lithium-ion secondary battery

PRIOR ART DOCUMENTS

Patent Documents

Patent Document 1: JP 2004-047404 A
Patent Document 2: JP 2005-259697 A
Patent Document 3: JP 2006-202647 A
Patent Document 4: JP 2010-135338 A

DISCLOSURE OF INVENTION

Problem to be Solved by the Invention

The present invention has solved the above problem and provides a non-aqueous secondary battery having a high capacity and excellent large current characteristics.

Means for Solving Problem

A first non-aqueous secondary battery of the present invention includes a positive electrode, a negative electrode, a non-aqueous electrolyte, and a separator. The positive electrode includes a positive electrode mixture layer, and the positive electrode mixture layer contains a first positive electrode active material and a second positive electrode active material each composed of a lithium-containing composite oxide represented by General Composition Formula (1): $Li_{1+y}MO_2$ (1), where y satisfies $-0.15 \leq y \leq 0.15$, and M represents a single element or an element group including at least one selected from Co, Ni, Ti, Cr, Fe, Cu, Zn, Al, Ge, Sn, Mg, Ag, Tl, Nb, B, P, Zr, Ca, Sr, Ba, Mo, Ga and Mn. The first positive electrode active material contains Co, and satisfies $90 \leq a \leq 100$, where a (mol %) represents a ratio of Co to all elements constituting the M in General Composition Formula (1). The second positive electrode active material contains Co, Ni and Mn, and satisfies $10 \leq b \leq 35$, $45 \leq c \leq 65$ and $10 \leq d \leq 35$, where b (mol %), c (mol %) and d (mol %) respectively represent ratios of Co, Ni and Mn to all elements constituting the M in General Composition Formula (1). A ratio of the first positive electrode active material to all positive electrode active materials contained in the positive electrode mixture layer is 20 mass % or more, and the positive electrode mixture layer has a density of 3.4 g/cm³ or less. The negative electrode includes a negative electrode mixture layer, and the negative electrode mixture layer contains, as negative electrode active materials, graphite and a material containing Si and O as constituent elements represented by General Composition Formula (2): $SiO_x$ (2), where x satisfies $0.5 \leq x \leq 1.5$. The material containing Si and O as constituent elements forms a composite with a carbon material.

A second non-aqueous secondary battery of the present invention includes a positive electrode, a negative electrode, a non-aqueous electrolyte, and a separator. The positive electrode includes a positive electrode current collector and a positive electrode mixture layer. A conductive layer containing a conductive material is formed on a surface of the positive electrode current collector. The positive electrode mixture layer contains a first positive electrode active material and a second positive electrode active material each composed of a lithium-containing composite oxide represented by General Composition Formula (1): $Li_{1+y}MO_2$ (1), where y satisfies $-0.15 \leq y \leq 0.15$ and M represents a single element or an element group including at least one selected from Co, Ni, Ti, Cr, Fe, Cu, Zn, Al, Ge, Sn, Mg, Ag, Tl, Nb, B, P, Zr, Ca, Sr, Ba, Mo, Ga and Mn. The first positive electrode active material contains Co, and satisfies 90≤a≤100, where a (mol %) represents a ratio of Co to all elements constituting the M in General Composition Formula (1). The second positive electrode active material contains Co, Ni and Mn, and satisfies 10≤b≤35, 45≤c≤65 and 10≤d≤35, where b (mol %), c (mol %) and d (mol %) respectively represent ratios of Co, Ni and Mn to all elements constituting the M in General Composition Formula (1). A ratio of the first positive electrode active material to all positive electrode active materials contained in the positive electrode mixture layer is 20 mass % or more. The positive electrode mixture layer has a density of 3.4 g/cm³ or less.

Effects of the Invention

The present invention can provide a non-aqueous secondary battery having both a high capacity and excellent large current characteristics.

Figure 1:
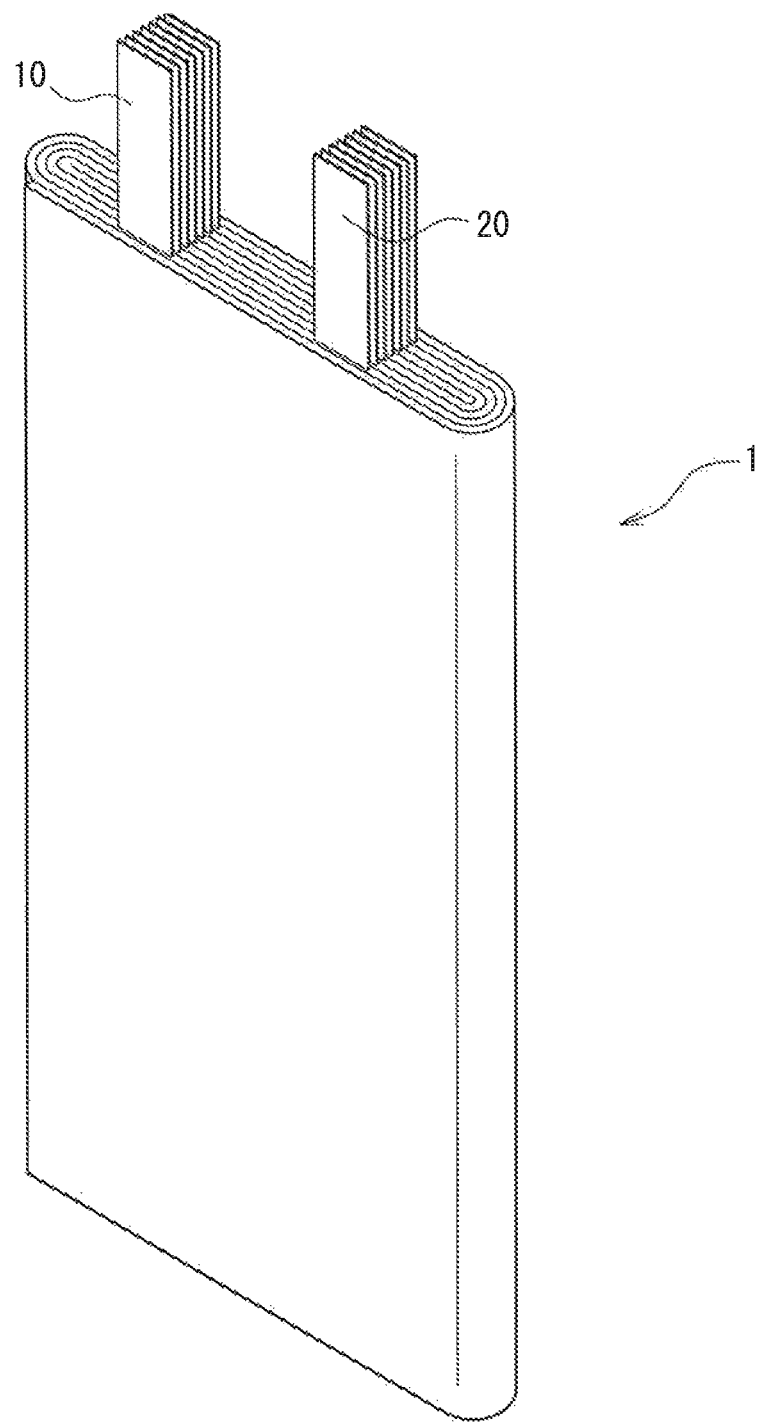
FIG. 1 is a perspective view schematically showing an example of a wound electrode body according to a non-aqueous secondary battery of the present invention.

DESCRIPTION OF THE INVENTION (First Non-Aqueous Secondary Battery of the Present Invention)

A first non-aqueous secondary battery of the present invention includes a positive electrode, a negative electrode, a non-aqueous electrolyte, and a separator. The positive electrode includes a positive electrode mixture layer, and the positive electrode mixture layer contains a first positive electrode active material and a second positive electrode active material each composed of a lithium-containing composite oxide represented by General Composition Formula (1): $Li_{1+y}MO_2$ (1).

In General Composition Formula (1), y satisfies −0.15≤y≤0.15, and M represents a single element or an element group including at least one selected from Co, Ni, Ti, Cr, Fe, Cu, Zn, Al, Ge, Sn, Mg, Ag, Tl, Nb, B, P, Zr, Ca, Sr, Ba, Mo, Ga and Mn.

The first positive electrode active material contains Co, and satisfies 90≤a≤100, where a (mol %) represents a ratio of Co to all elements constituting the M in General Composition Formula (1).

The second positive electrode active material contains Co, Ni and Mn, and satisfies 10≤b≤35, 45≤c≤65 and 10≤d≤35, where b (mol %), c (mol %) and d (mol %) respectively represent ratios of Co, Ni and Mn to all elements constituting the M in General Composition Formula (1).

Further, a ratio of the first positive electrode active material to all positive electrode active materials contained in the positive electrode mixture layer is 20 mass % or more, and the positive electrode mixture layer has a density of 3.4 g/cm³ or less.

The negative electrode includes a negative electrode mixture layer, and the negative electrode mixture layer contains, as negative electrode active materials, graphite and a material containing Si and O as constituent elements represented by General Composition Formula (2): $SiO_x$ (2).

In General Composition Formula (2), x satisfies 0.5≤x≤1.5. The material containing Si and O as constituent elements forms a composite with a carbon material.

With the above configuration, the first non-aqueous secondary battery of the present invention can have a high capacity and improved large current characteristics.

(Second Non-Aqueous Secondary Battery of the Present Invention)

A second non-aqueous secondary battery of the present invention includes a positive electrode, a negative electrode, a non-aqueous electrolyte, and a separator. The positive electrode includes a positive electrode current collector and a positive electrode mixture layer. A conductive layer containing a conductive material is formed on a surface of the positive electrode current collector.

The positive electrode mixture layer contains a first positive electrode active material and a second positive electrode active material each composed of a lithium-containing composite oxide represented by General Composition Formula (1): $Li_{1+y}MO_2$ (1).

In General Composition Formula (1), y satisfies −0.15≤y≤0.15 and M represents a single element or an element group including at least one selected from Co, Ni, Ti, Cr, Fe, Cu, Zn, Al, Ge, Sn, Mg, Ag, Tl, Nb, B, P, Zr, Ca, Sr, Ba, Mo, Ga and Mn.

The first positive electrode active material contains Co, and satisfies 90≤a≤100, where a (mol %) represents a ratio of Co to all elements constituting the M in General Composition Formula (1).

The second positive electrode active material contains Co, Ni and Mn, and satisfies 10≤b≤35, 45≤c≤65 and 10≤d≤35, where b (mol %), c (mol %) and d (mol %) respectively represent ratios of Co, Ni and Mn to all elements constituting the M in General Composition Formula (1).

Further, a ratio of the first positive electrode active material to all positive electrode active materials contained in the positive electrode mixture layer is 20 mass % or more. The positive electrode mixture layer has a density of 3.4 g/cm³ or less.

With the above configuration, the second non-aqueous secondary battery of the present invention can have a high capacity and enhanced large current characteristics.

The positive electrode of the second non-aqueous secondary battery of the present invention includes a positive electrode current collector and a positive electrode mixture layer, and for example, a conductive layer containing a conductive material (e.g., carbon fine particles) is formed on one side or both sides of the positive electrode current collector made of a metal foil, and the positive electrode mixture layer is arranged on the conductive layer of the positive electrode current collector.

As long as adequate current collecting characteristics can be obtained between the positive electrode mixture layer and the conductive layer, the conductive layer formed between the positive electrode mixture layer and the positive electrode current collector can decrease the resistance between the positive electrode mixture layer and the positive electrode current collector as compared with the case of directly forming the positive electrode mixture layer on the positive electrode current collector made of a metal foil. Thus, the impedance of the positive electrode can be reduced.

However, as a result of examinations, the present inventors have found that a positive electrode mixture layer containing a positive electrode active material at high density, i.e., a density of over 3.4 g/cm$^3$, cannot decrease the impedance of the positive electrode even when a conductive layer is formed between the positive electrode mixture layer and the positive electrode current collector. The reason for this is considered as follows. In the case of forming a positive electrode mixture layer directly on a positive electrode current collector made of a metal foil, a coating material for forming a positive electrode mixture layer is applied to the metal foil and then the coating thus formed is pressed by a pressure above a certain level to increase the density of the positive electrode mixture layer. By this press pressure, the constituent materials of the positive electrode mixture layer such as a positive electrode active material strongly press the metal foil, and hence, the contact resistance between the positive electrode mixture layer and the positive electrode current collector is low from the first. Therefore, the resistance therebetween cannot be reduced further even when a conductive layer is formed in the positive electrode current collector.

Meanwhile, when a positive electrode mixture layer has a density of 3.4 g/cm$^3$ or less, the press pressure to be applied on the coating should be set low. Accordingly, the pressure of the constituent materials of the positive electrode mixture layer with respect to the positive electrode current collector is low, and the contact resistance between the positive electrode mixture layer and the positive electrode current collector is high. To cope with this, a conductive layer capable of easily ensuring current collection with the positive electrode mixture layer without strong press is formed between the positive electrode current collector and the positive electrode mixture layer, whereby conductivity between the positive electrode mixture layer and the positive electrode current collector can be ensured satisfactorily via the conductive layer. Thus, the impedance of the positive electrode can be reduced effectively as compared with the case of not forming such a conductive layer.

In view of liquid absorbability for electrolytes, the density of the positive electrode mixture layer is preferably low, desirably 3.1 g/cm$^3$ or less. However, when the density of the positive electrode mixture layer is too low, the contact resistance between the positive electrode active materials or between the positive electrode active material and the conductive agent becomes high, which results in an increase in the impedance of the positive electrode, and also the filling amount of the positive electrode active materials decreases, which results in a decrease in the capacity of the positive electrode. Therefore, the density of the positive electrode mixture layer is desirably 2.5 g/cm$^3$ or more.

The conductive layer in the positive electrode current collector does not need to cover the entire surface of the positive electrode current collector made of a metal foil. As to a portion where the positive electrode mixture layer is formed, the effect of the present invention can be fully exhibited as long as the length of a portion having the conductive layer on the surface of the metal foil is 50% or more of the entire length of the portion where the positive electrode mixture layer is formed, in the cross-sectional view of the positive electrode current collector. That is, if the conductive layer is formed so that the ratio of the length of the portion where the positive electrode active material contacts the metal foil (positive electrode current collector) directly is 50% or less, the conductive layer can be formed to spread like islands over the metal foil, for example.

Further, the conductive layer does not need to have a uniform thickness. The conductive layer desirably has a concave-convex surface according to the unevenness of the lower surface (interface on the metal foil side) of the positive electrode mixture layer. The conductive layer deeply entering the concave portion of the positive electrode mixture layer can easily ensure current collection with the positive electrode mixture layer. Therefore, the height of the convex portion of the conductive layer from the surface of the metal foil in a state where the positive electrode mixture layer is formed is preferably 0.5 μm or more, more preferably 1 μm or more at a highest portion.

On the other hand, when the conductive layer is too thick and the convex portion is high, the proportion of the positive electrode mixture layer decreases, and the capacity of the positive electrode is reduced. Therefore, the height of the convex portion of the conductive layer from the surface of the metal foil is preferably 10 μm or less, more preferably 5 μm or less, and most preferably 2 μm or less at a highest portion.

The conductive material constituting the conductive layer is preferably high-conductive carbon fine particles. Examples of the carbon fine particles include carbonaceous materials that are generally used as conductive agents of positive or negative electrodes, including carbon blacks such as acetylene black and ketjen black, carbon nanotubes, vapor phase growth carbon fibers, hardly graphitizable carbon, artificial graphite, and natural graphite.

The particle diameter of the carbon fine particles is desirably 10 nm or more and 1 μm or less, more desirably 20 nm or more and 200 nm or less to ensure satisfactory conductivity and to prevent the conductive layer from being too thick.

In order to fix the carbon fine particles on the metal foil, the conductive layer desirably contains a binder. As the binder, resin binders that are generally used for binding a positive or negative electrode active material are used preferably. Examples of the resin binders include carboxymethyl cellulose (CMC), polyvinyl alcohol (PVA), styrene butadiene rubber (SBR), polyvinyl pyrrolidone (PVP), polyvinylidene fluoride (PVDF), and chitosan.

The ratio of the binder in the conductive layer to the total amount of the carbon fine particles and the binder is desirably 1 mass % or more, more desirably 10 mass % or more to obtain satisfactory adhesiveness between the metal foil and the conductive layer. At the same time, the ratio of the binder is desirably 90 mass % or less, more desirably 80 mass % or less to obtain conductivity of the conductive layer.

The conductive layer may contain other constituent components such as conductive polymers including polythiophene.

The conductive layer can be formed by dispersing or dissolving constituent components such as the carbon fine particles and binder in a solvent such as water or an organic solvent (e.g., N-methyl-2-pyrrolidone) and applying it to the metal foil, followed by drying.

The conductive layer coating film to be applied to the surface of the metal foil may cover the whole surface of the metal foil, or may expose part of the metal foil, such as an island-like film or a mesh-like film. When the film is an island-like film, for example, islands each having a diameter of 1 μm to 1 mm are spread on the film so that the ratio of the conductive layer becomes 50% or more.

Further, an aluminum foil, an aluminum alloy foil, a titanium foil, a nickel foil and the like that are generally used for a positive electrode can be used preferably as the metal foil.

In order to more satisfactorily ensure current collecting characteristics, the surface roughness Ra of the metal foil on the side on which the conductive layer is formed is preferably 0.5 μm or more, more preferably 1.0 μm or more.

When the surface roughness Ra of the metal foil is too large, the strength thereof decreases, which may results in cracks during charge and discharge. Therefore, the surface roughness Ra of the metal foil on which the conductive layer is formed is preferably 2.0 μm or less.

The surface roughness Ra of the metal foil as describe herein refers to an arithmetic mean roughness according to Japan Industrial Standard (JIS) B 0601. Specifically, it is a value determined by measuring three fields of view of 90 μm×90 μm at 50× magnification with a confocal scanning microscope ("Real-time Scanning Laser Microscope 1LM-21D" manufactured by Lasertec Corporation) at 900×900 pixels per field of view and determining an arithmetic mean of absolute values that are each obtained from an average line at each point, and further determining an arithmetic mean of values of the respective fields of view thus obtained.

The metal foil satisfying the above surface roughness Ra may be obtained, for example, by subjecting a metal foil to chemical surface treatment using acid, or subjecting a metal foil to physical surface treatment by sandblasting.

The thickness of the positive electrode current collector is preferably 30 μm or less, more preferably 20 μm or less, and most preferably 15 μm or less from the viewpoint of increasing the capacity of a non-aqueous secondary battery. When the positive electrode current collector is too thin, the strength thereof may lack and the handleability may be impaired. Therefore, the thickness is preferably 6 μm or more, more preferably 10 μm or more.

The positive electrode for use in the non-aqueous electrolyte secondary battery of the present invention can be obtained by forming a positive electrode mixture layer containing positive electrode active materials on a positive electrode current collector composed of the metal foil and the conductive layer formed on the surface of the metal foil.

(Matters Common and Correlated to First and Second Non-Aqueous Secondary Batteries of the Present Invention)

<Positive Electrode>

The positive electrode of the first and second non-aqueous secondary batteries of the present invention has a positive electrode mixture layer containing positive electrode active materials. For example, the positive electrode is an electrode in which a positive electrode mixture layer is formed on one side or both sides of a positive electrode current collector.

As the first and second positive electrode active materials, the lithium-containing composite oxide represented by General Composition Formula (1) is used.

The first positive electrode active material containing Co as a constituent element and satisfying $90 \leq a \leq 100$, where a (mol %) represents a ratio of Co to all elements constituting the M in General Composition Formula (1), has high stability in a high potential state, and thereby increasing safety and various battery characteristics of a non-aqueous secondary battery.

The second positive electrode active material containing Co, Ni and Mn as constituent elements and satisfying $10 \leq b \leq 35$, $45 \leq c \leq 65$ and $10 \leq d \leq 35$, where b (mol %), c (mol %) and d (mol %) respectively represent ratios of Co, Ni and Mn to all elements constituting the M in General Composition Formula (1), has high thermal stability, and thereby increasing safety and various battery characteristics of a non-aqueous secondary battery.

The ratio a of Co in the first positive electrode active material is 90 mol % or more from the viewpoint of increasing the capacity of the lithium-containing composite oxide.

The ratio c of Ni in the second positive electrode active material is 45 mol % or more from the viewpoint of increasing the capacity of the lithium-containing composite oxide. When the ratio of Ni in the M is too high, for example, the amounts of Co and Mn decrease, which may decrease the effects of Co and Mn. Therefore, the ratio c of Ni in the second positive electrode active material is 65 mol % or less.

Co contributes to the capacity of the lithium-containing composite oxide and enhances the filling density in the positive electrode mixture layer. However, when the amount of Co is too large, the cost may increase and safety may decrease. Therefore, the ratio b of Co in the second positive electrode active material is 10 mol % or more and 35 mol % or less.

The ratio d of Mn in the second positive electrode active material is 10 mol % or more and 35 mol % or less. By adding Mn in the lithium-containing composite oxide in the above range so as to make Mn present in the crystal lattice without fail, the thermal stability of the lithium-containing composite oxide can be enhanced and an even safer battery can be configured.

The M in General Composition Formula (1) representing the lithium-containing composite oxide may include elements other than Ni, Co and Mn, and examples thereof include Ti, Cr, Fe, Cu, Zn, Al, Ge, Sn, Mg, Ag, Tl, Nb, B, P, Zr, Ca, Sr, Ba, Mo and Ga. In order to satisfactorily ensure the above effects by addition of Ni, Co, and Mn in the lithium-containing composite oxide, a total ratio f (mol %) of the elements other than Ni, Co and Mn to all elements constituting the M in General Composition Formula (1) is preferably 15 mol % or less, more preferably 3 mol % or less.

For example, when Al is present in the crystal lattice in the lithium-containing composite oxide, the crystal structure of the lithium-containing composite oxide can be stabilized and the thermal stability thereof can be enhanced, and thereby an even safer non-aqueous secondary battery can be configured. Further, the presence of Al in grain boundaries and on surfaces of particles of the lithium-containing composite oxide can maintain the stability over time and prevent side reactions with an electrolyte, and thereby a non-aqueous secondary battery with a longer life can be configured.

However, since Al cannot contribute to a charge and discharge capacity, the capacity may decrease as the content of Al in the lithium-containing composite oxide increases. Therefore, the ratio of Al to all elements constituting the M in General Composition Formula (1), representing the lithium-containing composite oxide, is preferably 10 mol % or less. In order to more satisfactorily ensure the above effect by addition of Al in the lithium-containing composite oxide, the ratio of Al to all elements constituting the M in General Composition Formula (1), representing the lithium-containing composite oxide, is preferably 0.02 mol % or more.

When Mg is present in the crystal lattice in the lithium-containing composite oxide, the crystal structure of the lithium-containing composite oxide can be stabilized and the thermal stability thereof can be enhanced, and thereby an even safer non-aqueous secondary battery can be configured. Further, when the lithium-containing composite oxide undergoes a phase transition due to doping and dedoping of Li during charge and discharge of the non-aqueous secondary battery, Mg migrates to Li sites, thereby mitigating the irreversible reaction and increasing the reversibility of the crystal structure of the lithium-containing composite oxide, and it is therefore possible to obtain a non-aqueous secondary battery with a longer charge and discharge cycle life. Particularly when the lithium-containing composite oxide has a Li-deficient crystal structure by setting $1+y<0$ in General Composition Formula (1) representing the lithium-containing composite oxide, Mg, instead of Li, migrates to Li sites to form the lithium-containing composite oxide, and therefore a stable compound can be obtained.

However, because of a small contribution of Mg to a charge and discharge capacity, the capacity may decrease when the content of Mg in the lithium-containing composite oxide is too large. Therefore, the ratio of Mg to all elements constituting the M in General Composition Formula (1), representing the lithium-containing composite oxide, is preferably 10 mol % or less. In order to satisfactorily ensure the above effect by addition of Mg in the lithium-containing composite oxide, the ratio of Mg to all elements constituting the M in General Composition Formula (1), representing the lithium-containing composite oxide, is preferably 0.02 mol % or more.

When the particles of the lithium-containing composite oxide contain Ti, it is incorporated in crystal defect sites due to oxygen deficiency or the like in the $LiNiO_2$ type crystal structure and stabilizes the crystal structure, increasing the reversibility in the reaction of the lithium-containing composite oxide, and it is therefore possible to configure a non-aqueous secondary battery having more excellent charge and discharge cycle characteristics. In order to satisfactorily ensure the above effects, the ratio of Ti to all elements constituting the M in General Composition Formula (1), representing the lithium-containing composite oxide, is preferably 0.01 mol % or more, more preferably 0.1 mol % or more. However, when the content of Ti is too large, the capacity decreases because Ti is not involved in charge and discharge, and a heterogeneous phase such as $Li_2TiO_3$ becomes likely to be formed, which may degrade characteristics. Therefore, the ratio of Ti to all elements constituting the M in General Composition Formula (1), representing the lithium-containing composite oxide, is preferably 10 mol % or less, more preferably 5 mol % or less, and further preferably 2 mol % or less.

Further, it is preferred that the lithium-containing composite oxide contain at least one element M' selected from Ge, Ca, Sr, Ba, B, Zr and Ga as the M in General Composition Formula (1) from the viewpoint of ensuring the following effects.

When the lithium-containing composite oxide contains Ge, the crystal structure of the composite oxide after Li has been eliminated is stabilized, and therefore the reversibility in the reaction in the charge and discharge can be enhanced and an even safer non-aqueous secondary battery having more excellent charge and discharge cycle characteristics can be configured. Particularly when Ge is present on surfaces or in grain boundaries of particles of the lithium-containing composite oxide, crystal structural disorder during elimination and insertion of Li can be prevented in the boundaries of the crystals of the lithium-containing composite oxide, greatly enhancing charge and discharge cycle characteristics.

Further, when the lithium-containing composite oxide contains an alkaline-earth metal such as Ca, Sr or Ba, the growth of primary particles is promoted and the crystallinity of the lithium-containing composite oxide is improved, and it is therefore possible to reduce active sites of the lithium-containing composite oxide, improve the stability over time when used as a coating material for forming a positive electrode mixture layer, and prevent irreversible reactions with an electrolyte in a non-aqueous secondary battery. Furthermore, the presence of these elements on surfaces or in grain boundaries of particles of the lithium-containing composite oxide enables trapping of $CO_2$ gas within the battery, and it is therefore possible to configure a long life non-aqueous secondary battery having more excellent storage characteristics. Particularly when the lithium-containing composite oxide contains Mn, there is a tendency that primary particles cannot easily grow, and it is therefore more effective to add an alkaline-earth metal such as Ca, Sr or Ba.

Also when the lithium-containing composite oxide contains B, the growth of primary particles is promoted and the crystallinity of the lithium-containing composite oxide is improved, and it is therefore possible to reduce active sites, and prevent irreversible reactions with atmospheric moisture, the binder used to form a positive electrode mixture layer and the electrolyte in the battery. Accordingly, the stability over time when used as a coating material for forming a positive electrode mixture layer can be improved, and the generation of gas within the battery can be prevented, and it is therefore possible to configure a long life non-aqueous secondary battery having more excellent storage characteristics. Particularly when the lithium-containing composite oxide contains Mn, there is a tendency that primary particles cannot easily grow, and it is therefore more effective to add B.

When the lithium-containing composite oxide contains Zr, the presence of Zr on surfaces or in grain boundaries of particles of the lithium-containing composite oxide prevents the surface activity of the lithium-containing composite oxide without degrading the electrochemical characteristics of the lithium-containing composite oxide, and it is therefore possible to configure a long life non-aqueous secondary battery having more excellent storage characteristics.

When the lithium-containing composite oxide contains Ga, the growth of primary particles is promoted and the crystallinity of the lithium-containing composite oxide is improved, and it is therefore possible to reduce active sites, improve the stability over time when used as a coating material for forming a positive electrode mixture layer, and prevent irreversible reactions with an electrolyte. Also, by incorporating Ga within the crystal structure of the lithium-containing composite oxide in the form of a solid solution, the interlayer spacing of the crystal lattice can be expanded, and the percentage of expansion and contraction of the lattice due to Li insertion and elimination can be reduced. Accordingly, the reversibility of the crystal structure can be increased, and it is therefore possible to configure a non-aqueous secondary battery having higher charge and discharge cycle characteristics. Particularly when the lithium-containing composite oxide contains Mn, there is a tendency that primary particles cannot easily grow, and it is therefore more effective to add Ga.

In order to easily obtain the effects of the element M' selected from Ge, Ca, Sr, Ba, B, Zr and Ga, the ratio of the element M' to all elements constituting the M in General Composition Formula (1) is preferably 0.1 mol % or more and 10 mol % or less.

The elements other than Ni, Co and Mn in the M in General Composition Formula (1) may be distributed uniformly in the lithium-containing composite oxide, or may be segregated on surfaces of particles or the like.

Further, in the second positive electrode active material composed of the lithium-containing composite oxide, when a relationship between the ratio b of Co and the ratio d of Mn in the M in General Composition Formula (1) is b>d, the growth of particles of the lithium-containing composite oxide is promoted, and a lithium-containing composite oxide having a high filling density in a positive electrode (positive electrode mixture layer thereof) and higher reversibility can be obtained, and it can be expected that the capacity of a battery using such a positive electrode is further enhanced.

On the other hand, in the second positive electrode active material composed of the lithium-containing composite oxide, when a relationship between the ratio b of Co and the ratio d of Mn in the M in General Composition Formula (1) is $b \leq d$, a lithium-containing composite oxide having higher thermal stability can be obtained, and it can be expected that safety of a battery using the lithium-containing composite oxide is further enhanced.

The second positive electrode active material having the above composition has a true density of as large as 4.55 to 4.95 g/cm$^3$ and serves as a material having a high volume energy density. The true density of the lithium-containing composite oxide containing Mn in a predetermined range greatly varies depending on the composition thereof. However, the structure of the lithium-containing composite oxide is stabilized in the above small composition range, and the uniformity thereof can be enhanced. Therefore, it is considered that the true density of the lithium-containing composite oxide containing Mn in a predetermined range has a large value close to that of the true density of LiCoO$_2$, for example. Further, the capacity per mass of the lithium-containing composite oxide can be increased, and hence a material excellent in reversibility can be obtained.

The true density of the lithium-containing composite oxide becomes larger particularly when the lithium-containing composite oxide has a composition close to a stoichiometric ratio. Specifically, in General Composition Formula (1), the true density and the reversibility can be enhanced by adjusting the value of y to be $-0.15 \leq y \leq 0.15$. It is more preferred that "y" be −0.05 or more and 0.05 or less, and in this case, the true density of the lithium-containing composite oxide can be set to a higher value of 4.6 g/cm$^3$ or more.

The composition of the lithium-containing composite oxide used as the first and second positive electrode active materials can be analyzed with an introductive coupled plasma (ICP) method in the following manner. First, 0.2 g of a lithium-containing composite oxide to be measured is collected and placed in a 100 mL container. 5 mL of pure water, 2 mL of aqua regia, and 10 mL of pure water are added successively to the lithium-containing composite oxide and dissolved by heating, which then is cooled and diluted by 25 times with pure water. The composition of this dilution is analyzed by a calibration curve method with an ICP analyzer "ICP-757" produced by Jarrelash. A composition formula of the lithium-containing composite oxide can be obtained from the result.

The second positive electrode active material represented by General Composition Formula (1) can be produced by mixing a Li-containing compound (lithium hydroxide-.monohydrate, etc.), a Ni-containing compound (nickel sulfate, etc.), a Co-containing compound (cobalt sulfate, etc.), a Mn-containing compound (manganese sulfate, etc.), and a compound (aluminum sulfate, magnesium sulfate, etc.) containing the other elements contained in the M and firing the resultant mixture. Further, in order to synthesize the lithium-containing composite oxide with higher purity, it is preferred that a composite compound (hydroxide, oxide, etc.) containing a plurality of elements contained in the M and the Li-containing compound be mixed and fired.

The firing condition can be set to, for example, 1 to 24 hours at 800° C. to 1,050° C., and it is preferred that the mixture be heated temporarily to temperature (for example, 250° C. to 850° C.) lower than the firing temperature and kept at the temperature for preheating, and thereafter, the temperature be increased to the firing temperature to allow a reaction to proceed. The preheating time is not particularly limited, and generally, it is appropriate to set it to about 0.5 to 30 hours. Further, the atmosphere during firing can be set to an atmosphere containing oxygen (that is, in the atmosphere), a mixed atmosphere of inactive gas (argon, helium, nitrogen, etc.) and oxygen gas, an atmosphere of oxygen gas, or the like. The oxygen concentration (based on a volume) in this case is preferably 15% or more, more preferably 18% or more.

In the non-aqueous secondary battery of the present invention, only the lithium-containing composite oxide represented by General Composition Formula (1) may be used as the positive electrode active material, or other positive electrode active materials may be used in combination with the lithium-containing composite oxide represented by General Composition Formula (1).

Examples of other positive electrode active materials that may be used in combination with the lithium-containing composite oxide represented by General Composition Formula (1) include: lithium manganese oxides such as LiMnO$_2$ and Li$_2$MnO$_3$; lithium nickel oxides such as LiNiO$_2$; spinel-structured lithium-containing composite oxides such as LiMn$_2$O$_4$ and Li$_{4/3}$Ti$_{5/3}$O$_4$; olivine-structured lithium-containing composite oxides such as LiFePO$_4$; and the oxides partially substituted with various elements. These may be used alone or in combination of two or more.

In the non-aqueous secondary battery of the present invention, the content of the lithium-containing composite oxide represented by General Composition Formula (1) with respect to the total amount of the positive electrode active material is preferably 85 mass % or more, particularly preferably 100 mass % (i.e., only the lithium-containing composite oxide represented by General Composition Formula (1) is used).

Further, the ratio of the first positive electrode active material to all positive electrode active materials contained in the positive electrode mixture layer is 20 mass % or more. Thus, large current characteristics of a non-aqueous secondary battery can be enhanced. Further, the ratio of the first positive electrode active material is preferably 90 mass % or less for the purpose of exhibiting the characteristics of the second positive electrode active material. Accordingly, the ratio of the second positive electrode active material to all positive electrode active materials contained in the positive electrode mixture layer is preferably 10 mass % or more.

The positive electrode mixture layer generally contains a conductive agent and a binder in addition to the positive electrode active material. Examples of the conductive agent of the positive electrode mixture layer include carbon materials, including: graphites (graphite carbon materials) such as natural graphite and artificial graphite; carbon blacks such as acetylene black, ketjen black, channel black, furnace black, lamp black and thermal black; and carbon fibers. Examples of the binder of the positive electrode mixture layer include polyvinylidene fluoride (PVDF), polytetrafluoroethylene (PTFE), styrene butadiene rubber (SBR), and carboxymethyl cellulose (CMC).

The positive electrode is produced, for example, by preparing a positive electrode mixture containing coating material in the form of a paste or slurry in which a positive electrode active material, a conductive agent and a binder are dispersed in a solvent such as water or N-methyl-2-pyrrolidone (NMP), applying it to one side or both sides of a current collector, drying the current collector, and optionally calendering the current collector. However, the positive electrode production method is not limited to the above method, and it is possible to use any other production method.

The positive electrode has a current collector tab for electrical connection with other members in a non-aqueous secondary battery. The current collector tab of the positive electrode may be an exposed portion of a current collector on which a positive electrode mixture layer is not formed, or may be formed by welding a current collector tab made of a 50 to 300 μm-thick metal foil (aluminum foil, nickel foil, etc.) to an exposed portion of a current collector.

Any conventionally known metal foils used in the positive electrode of the lithium-ion secondary battery may be used as the positive electrode current collector. For example, an aluminum foil having a thickness of 10 to 30 μm is used preferably.

As to the composition of the positive electrode mixture layer, for example, the content of the positive electrode active material is preferably 60 to 95 mass %, that of the binder is preferably 1 to 15 mass %, and that of the conductive agent is preferably 3 to 20 mass %.

The positive electrode mixture layer has a density of 3.4 g/cm$^3$ or less, preferably 3.2 g/cm$^3$ or less. By limiting the density of the positive electrode mixture layer to the above range, a certain space is left in the positive electrode mixture layer and a pass line of an electrolyte can be formed. Thus, large current characteristics and charge and discharge cycle characteristics of a non-aqueous secondary battery can be enhanced.

The positive electrode mixture layer has a density of preferably 2.5 g/cm$^3$ or more, more preferably 2.8 g/cm$^3$ or more from the viewpoint of preventing a decrease in the capacity of a positive electrode.

Further, the density of the mixture layer (positive electrode mixture layer and negative electrode mixture layer) as used herein refers to a value measured by the following method. First, an electrode (positive or negative electrode) is cut to have a predetermined area. The mass of the cut area is measured using an electronic balance of a minimum scale of 0.1 mg, and the mass of a current collector is subtracted from the mass of the cut area to calculate the mass of the mixture layer. On the other hand, the total thickness of the electrode is measured at 10 points with a micrometer of a minimum scale of 1 μm, and the volume of the mixture layer is calculated from an average value of values obtained by subtracting the thickness of the current collector from the values measured at 10 points and the area of the electrode. Then, the density of the mixture layer is calculated by dividing the mass of the mixture layer by the volume thereof.

<Negative Electrode>

The negative electrode of the non-aqueous secondary battery of the present invention has a negative electrode mixture layer containing a negative electrode active material. For example, the negative electrode is an electrode in which a negative electrode mixture layer is formed on one side or both sides of a current collector.

As the negative electrode active material, graphites such as natural graphite (flake graphite), artificial graphite, and expandable graphite can be used.

Although the above graphites can be used as the negative electrode active material, other negative electrode active materials may be used in combination with graphite. Examples of other negative electrode active materials that may be used in combination with graphite include carbon materials, including: easily graphitizable carbonaceous materials such as cokes obtained by firing pitch; and hardly graphitizable carbonaceous materials such as furfuryl alcohol resin (PFA), polyparaphenylene (PPP), and amorphous carbon obtained by firing, e.g., phenol resin at a low temperature. Other than the carbon materials, it is also possible to use lithium or lithium-containing compounds in combination with graphite as the negative electrode active material. Examples of the lithium-containing compounds include lithium alloys such as Li—Al, and alloys containing an element that can be alloyed with lithium, such as Si and Sn. Further, oxide-based materials such as Sn oxides and Si oxides also can be used in combination with graphite.

Among the above negative electrode active materials, particularly in order to increase the capacity of a battery, it is preferred to use a material that contains Si and O as constituent elements, that is represented by General Composition Formula SiO$_x$, and that satisfies $0.5 \leq x \leq 1.5$ in the above General Composition Formula (hereinafter, the material is also referred to as "SiO$_x$" simply). In the first non-aqueous secondary battery of the present invention, a negative electrode active material containing SiO$_x$ is used.

SiO$_x$ may contain a microcrystal or an amorphous phase of Si, and in this case, an atomic ratio between Si and O becomes a ratio including a microcrystal or an amorphous phase of Si. That is, SiO$_x$ includes a structure in which Si (for example, microcrystalline Si) is dispersed in an amorphous SiO$_2$ matrix, and x in the above General Composition Formula of a combination of the amorphous SiO$_2$ and Si dispersed therein only needs to satisfy $0.5 \leq x \leq 1.5$. For example, in the case of a material having a molar ratio of SiO$_2$ and Si of 1:1 in a structure in which Si is dispersed in an amorphous SiO$_2$ matrix, x is equal to 1. Therefore, the structural formula of that material is expressed as SiO. In the case of a material with such a structure, a peak caused by the presence of Si (microcrystalline Si) may not be observed, for example, in X-ray diffraction analysis. However, when the material is observed with a transmission type electron microscope, the presence of fine Si can be confirmed.

Since SiO$_x$ is poor in conductivity, the surface of SiO$_x$ may be coated with a carbon material so as to be formed into a composite. Thus, a conductive network in the negative electrode can be formed more satisfactorily. In the first non-aqueous secondary battery of the present invention, SiO$_x$ is used as a composite described above.

Examples of the carbon material for coating the surface of SiO$_x$ include low crystalline carbon, carbon nanotubes, and vapor phase growth carbon fibers.

In the case of coating the surface of SiO$_x$ with carbon by a chemical vapor deposition (CVD) method, in which hydrocarbon based gas is heated in a gas phase and carbon generated by thermal decomposition of the hydrocarbon based gas is deposited on the surfaces of the SiO$_x$ particles, the hydrocarbon based gas spreads sufficiently to the SiO$_x$ particles, and a thin and uniform coating film (carbon coating layer) containing conductive carbon can be formed on the surfaces of the particles and in the pores thereof. Thus, a small amount of carbon can impart conductivity to the SiO$_x$ particles uniformly.

Examples of a liquid source of the hydrocarbon based gas to be used in the CVD method include toluene, benzene, xylene and mesitylene, and toluene that is easy to handle is particularly preferred. Hydrocarbon based gas can be obtained by vaporizing any of these sources (for example, causing bubbling with nitrogen gas). Further, methane gas, ethylene gas, acetylene gas, or the like can also be used.

The treatment temperature of the CVD method is preferably 600 to 1200° C., for example. Further, SiO$_x$ to be subjected to the CVD method is preferably granules (composite particles) granulated by a known technique.

In the case of coating the surface of $SiO_x$ with carbon, the amount of carbon with respect to 100 parts by mass of $SiO_x$ is preferably 5 parts by mass or more, more preferably 10 parts by mass or more, and preferably 95 parts by mass or less, more preferably 90 parts by mass or less.

As with other high-capacity negative electrode materials, the volume of $SiO_x$ greatly varies in accordance with charge and discharge of a battery. Therefore, it is preferred to use $SiO_x$ in combination with graphite as the negative electrode active material. Thus, the capacity of a battery can be increased through the use of $SiO_x$ while preventing the expansion and contraction of a negative electrode in accordance with charge and discharge of a battery, and thereby maintaining higher charge and discharge cycle characteristics. In the first non-aqueous secondary battery of the present invention, the above composite (carbon-coated $SiO_x$) and graphite are used in combination.

When the carbon-coated $SiO_x$ (composite) and graphite are used in combination as the negative electrode active material, the ratio of the carbon-coated $SiO_x$ to the total amount of the negative electrode active material is preferably 2 mass % or more from the viewpoint of satisfactorily ensuring an effect of increasing the capacity of a battery through use of the carbon-coated $SiO_x$, and preferably 20 mass % or less from the viewpoint of preventing the expansion and contraction of a negative electrode due to the carbon-coated $SiO_x$.

The negative electrode mixture layer generally contains a binder in addition to the negative electrode active material. Examples of the binder of the negative electrode mixture layer include the same as those of the positive electrode mixture layer listed above.

The negative electrode mixture layer may contain a conductive agent as needed. Examples of the conductive agent of the negative electrode mixture layer include the same as those of the positive electrode mixture layer listed above.

The negative electrode is produced, for example, by preparing a negative electrode mixture containing coating material in the form of a paste or slurry in which a negative electrode active material, a binder, and as needed a conductive agent are dispersed in a solvent such as water or NMP, applying it to one side or both sides of a current collector, drying the current collector, and optionally calendering the current collector. However, the negative electrode production method is not limited to the above method, and it is possible to use any other production method.

The negative electrode has a current collector tab for electrical connection with other members in a non-aqueous secondary battery. The current collector tab of the negative electrode may be an exposed portion of a current collector on which a negative electrode mixture layer is not formed, or may be formed by welding a current collector tab made of a 50 to 300 μm-thick metal foil (nickel foil, etc.) to an exposed portion of a current collector.

Examples of the negative electrode current collector include a foil, a punched metal, an expanded metal, and a mesh made of copper, stainless steel, nickel, titanium and alloys thereof. Generally, a copper foil having a thickness of 5 to 30 μm is used preferably.

As to the composition of the negative electrode mixture layer, the content of the negative electrode active material is preferably 70 to 99 mass %, and that of the binder is preferably 1 to 30 mass %. In the case of using the conductive agent, the content of the conductive agent in the negative electrode mixture layer is preferably 1 to 20 mass %.

The negative electrode mixture layer preferably has a density of 1.55 g/cm$^3$ or less. By limiting the density of the negative electrode mixture layer to the above range, a certain space is left in the negative electrode mixture layer and a pass line of an electrolyte can be formed. Thus, large current characteristics and charge and discharge cycle characteristics of a non-aqueous secondary battery can be enhanced. Further, from the viewpoint of preventing a decrease in the capacity of a negative electrode, the negative electrode mixture layer preferably has a density of 1.3 g/cm$^3$ or more.

<Mixture Layer>

In the present invention, positive and negative electrode mixture layers having a certain level of thickness can ensure large current characteristics that enable charge and discharge at large current. However, when the positive or negative electrode mixture layer is too thick, the effect of enhancing large current characteristics of a battery may decrease. Therefore, the sum of the thicknesses of the positive and negative electrode mixture layers is preferably 200 μm or less. Further, the sum of the thicknesses of the positive and negative electrode mixture layers is preferably 120 μm or more.

The thickness of the positive electrode mixture layer is preferably 50 to 100 μm, and that of the negative electrode mixture layer is preferably 70 to 130 μm.

<Electrode Body>

The positive electrode and the negative electrode are used in the non-aqueous secondary battery of the present invention in the form of a laminated body (laminated electrode body) obtained by laminating positive electrodes and negative electrodes via separators, or a wound body (wound electrode body) obtained by spirally winding the laminated body.

The laminated electrode body can be formed by laminating a plurality of positive electrodes and a plurality of negative electrodes via a plurality of separators. The laminated electrode body can also be formed by: arranging a plurality of positive electrodes at a predetermined interval on one side of a belt-like separator (lower separator); placing separators (upper separators) that have been cut according to the shape of the positive electrodes on the positive electrodes; thermally fusing the peripheries of the upper separators (peripheries thereof excluding parts from which positive electrode current collector tabs are drawn) to form the separators into a bag shape, and wrapping the positive electrodes with the portions of the bag-shaped separators; folding the lower separator zigzag at portions of the lower separator not opposed to the positive electrodes; arranging negative electrodes between the folded separators; and arranging negative electrodes on the uppermost parts of the further folded separator.

The laminated electrode body can also be formed by using belt-like separators as upper and lower separators, the method including: arranging a plurality of positive electrodes at a predetermined interval on one side of a lower separator; placing an upper separator on the surface of the lower separator on the side on which the positive electrodes are arranged; thermally fusing the lower separator and the upper separator in the vicinities of the peripheries of the positive electrodes (in the vicinities of the peripheries thereof excluding parts from which positive electrode current collector tabs are drawn) to form bag-shaped portions in the separators, and wrapping the positive electrodes with the bag-shaped portions; folding the separators zigzag at portions of the separators not opposed to the positive electrodes; arranging negative electrodes between the folded separators; and arranging negative electrodes on the uppermost parts of the further folded separators.

In the case where the electrode body of the non-aqueous secondary battery of the present invention is a laminated electrode body, since each of the positive electrode and the negative electrode has a current collector tab, an area of the electrode (positive electrode and negative electrode) that is responsible for collecting current in each current collector tab is relatively small. Therefore, a battery having a laminated electrode body has low direct current resistance, and thereby large current characteristics can be enhanced.

On the other hand, in the case where the electrode body of the non-aqueous secondary battery of the present invention is a wound electrode body, the electrode body is configured to include a plurality of positive electrode current collector tabs protruding from the positive electrode in one end face of the electrode body and a plurality of negative electrode current collector tabs protruding from the negative electrode in one end face of the electrode body.

FIG. 1 is a perspective view schematically showing an example of a wound electrode body of a non-aqueous secondary battery of the present invention. In FIG. 1, a wound electrode body 1 has a plurality of positive electrode current collector tabs 10 protruding from a positive electrode in one end face of the electrode body (upper end face in FIG. 1) and a plurality of negative electrode current collector tabs 20 protruding from a negative electrode in the same end face of the electrode body.

The positive electrode and the negative electrode constituting the wound electrode body are generally long belt-like electrodes. When such positive and negative electrodes each have only one current collector tab, an area of the electrode that is responsible for collecting current in each current collector tab will be larger than the each current collector tab of the electrodes of the laminated electrode body, which tends to increase direct current resistance. Therefore, in the case of adopting a wound electrode body, a plurality of current collector tabs are provided in the positive electrode and the negative electrode constituting the wound electrode body to reduce direct current resistance of a battery and to enhance large current characteristics.

The number of the positive electrode current collector tab and the negative electrode current collector tab in the wound electrode body may be, for example, 3 or more, and the upper limit thereof may be twice the number of wirings.

[Separator]

The separator of the non-aqueous secondary battery of the present invention preferably has sufficient strength and can retain a large amount of a non-aqueous electrolyte, and may be, e.g., a microporous film made of polyolefin such as polyethylene (PE) and polypropylene (PP) having a thickness of 5 to 50 µm and an opening ratio of 30 to 70%. The microporous film constituting a separator may be, e.g., a film made only of PE or PP, may contain an ethylene-propylene copolymer, or may be a laminated body of a PE microporous film and a PP microporous film.

As the separator of the non-aqueous secondary battery of the present invention, it is possible to use a laminated type separator including a porous layer (I) composed mainly of a resin having a melting point of 140° C. or lower and a porous layer (II) composed mainly of a resin that does not melt at a temperature of 150° C. or lower or an inorganic filler having a heat resistant temperature of 150° C. or higher. The term "melting point" as used herein refers to melting temperature measured with a differential scanning calorimeter (DSC) in accordance with Japan Industrial Standard (JIS) K 7121. Further, the term "heat resistant temperature of 150° C. or more" means that no deformation such as softening is observed at least at 150° C.

The porous layer (I) of the laminated type separator mainly serves to ensure a shut-down function. When a non-aqueous secondary battery reaches the melting point of the resin that is a main component of the porous layer (I), the resin of the porous layer (I) melts to close the pores of the separator, causing a shutdown for preventing the progress of electrochemical reaction.

The resin having a melting point of 140° C. or lower used as a main component of the porous layer (I) can be, for example, PE, and used in a form of a PE microporous film used in an non-aqueous secondary battery, or a form obtained by applying PE particles on a substrate such as a non-woven fabric. Here, the volume ratio of the resin having a melting point of 140° C. or lower used as a main component is 50 volume % or more, more preferably 70 volume % or more in the total constituent components of the porous layer (I). In the case where the porous layer (I) is formed of the PE microporous film described above, the volume ratio is 100 volume %.

The porous layer (II) of the laminated type separator has a function of preventing a short-circuit caused by direct contact between a positive electrode and a negative electrode even when the internal temperature of a non-aqueous secondary battery rises high. This function is ensured by the resin that does not melt at a temperature of 150° C. or lower or the inorganic filler having a heat resistant temperature of 150° C. or higher. That is, in the case where a battery reaches high temperature, even if the porous layer (I) is contracted, the porous layer (II) that is unlikely to be contracted can prevent a short-circuit caused by direct contact between positive and negative electrodes, which may occur in the case where the separator is thermally contracted. Further, the heat-resistant porous layer (II) serves as a framework of the separator, and hence the thermal contraction of the porous layer (I), that is, the thermal contraction of the entire separator can also be prevented.

In the case of forming the porous layer (II) containing the resin that does not melt at a temperature of 150° C. or lower as a main component, for example, there are given a form obtained by laminating a microporous film (for example, a microporous film made of PP) formed of the resin that does not melt at a temperature of 150° C. or lower on the porous layer (I), and a coated and laminated type obtained by applying a coating liquid for forming the porous layer (II) containing fine particles of the resin that does not melt at a temperature of 150° C. or less to the porous layer (I), and thereby laminating the porous layer (II) containing fine particles of the resin that does not melt at a temperature of 150° C. or less on the porous layer (I).

Examples of the resin that does not melt at a temperature of 150° C. or less include various cross-linked polymers such as cross-linked methyl polymethacrylate, cross-linked polystyrene, cross-linked polydivinylbenzene, a styrene-divinylbenzene copolymer cross-linked product, polyimide, a melamine resin, a phenol resin, and a benzoguanamine-formaldehyde condensate; heat resistant polymers such as PP, polysulfone, polyethersulphone, polyphenylenesulfide, polytetrafluoroethylene, polyacrylonitrile, aramide, and polyacetal.

The average particle diameter of fine particles of the resin that does not melt at a temperature of 150° C. or less is, for example, preferably 0.01 μm or more, more preferably 0.1 μm or more, and preferably 10 μm or less, more preferably 2 μm or less.

The average particle diameter of fine particles as used herein (fine particles of the resin that does not melt at a temperature of 150° C. or less, inorganic filler having a heat resistant temperature of 150° C. or higher, etc.) is the particle size with an accumulated volume percentage of 50% (D50) that is measured with a laser diffraction particle size analyzer (e.g., "LA-920" manufactured by Horiba, Ltd.) by dispersing the fine particles in a medium that does not dissolve the fine particles.

Since the fine particles of the resin that does not melt at a temperature of 150° C. or less are contained in the porous layer (II) as a main component, the amount of the fine particles is 50 volume % or more, preferably 70 volume % or more, more preferably 80 volume % or more, further preferably 90 volume % or more, and preferably 99 volume % or less with respect to the total volume of the constituent components of the porous layer (II) (total volume excluding pore parts).

In the case of forming the porous layer (II) containing an inorganic filler having a heat resistant temperature of 150° C. or more as a main component, for example, there is given a coated and laminated type obtained by applying a coating liquid for forming the porous layer (II) containing an inorganic filler having a heat resistant temperature of 150° C. or more to the porous layer (I), and thereby laminating the porous layer (II) containing an inorganic filler having a heat resistant temperature of 150° C. or more on the porous layer (I).

It is appropriate that the inorganic filler of the porous layer (II) is stable with respect to a non-aqueous electrolyte contained in a non-aqueous secondary battery having a heat resistant temperature of 150° C. or more, and further is electrochemically stable so as not to be oxidized or reduced in a working voltage of a non-aqueous secondary battery. The organic filler is preferably fine particles from the viewpoint of dispersion and the like, and alumina, silica, and boehmite are preferred. Alumina, silica, and boehmite have high oxidation tolerance, and the particle diameter and shape thereof can be adjusted to desired numerical values. Therefore, alumina, silica, and boehmite enable the porosity of the porous layer (II) to be controlled with good accuracy. Regarding the inorganic filler having a heat resistant temperature of 150° C. or more, for example, the inorganic fillers as illustrated above may be used alone or in combination with two or more kinds. The inorganic filler having a heat resistant temperature of 150° C. or more may be used together with the above fine particles of the resin that does not melt at a temperature of 150° C. or less.

The shape of the inorganic filler having a heat resistant temperature of 150° C. or more of the porous layer (II) is not particularly limited, and various shapes such as a substantially spherical shape (including a spherical shape), a substantially elliptical shape (including an elliptical shape), and a plate shape can be used.

Further, the average particle diameter of the inorganic filler having a heat resistant temperature of 150° C. or more of the porous layer (II) is preferably 0.3 μm or more, more preferably 0.5 μm or more, because the ion permeability is degraded when the average particle diameter is too small. Further, when the inorganic filler having a heat resistant temperature of 150° C. or more is too large, the electric characteristics tend to be degraded, and hence, the average particle diameter thereof is preferably 5 μm or less, more preferably 2 μm or less.

Since the inorganic filler having a heat resistant temperature of 150° C. or more of the porous layer (II) is contained in the porous layer (II) as a main component, the amount of the inorganic filler in the porous layer (II) is 50 volume % or more, preferably 70 volume % or more, more preferably 80 volume % or more, further preferably 90 volume % or more, and preferably 99 volume % or less with respect to the total volume of the constituent components of the porous layer (II) (total volume excluding pore parts). By setting the content of the inorganic filler in the porous layer (II) to be high as described above, even when a non-aqueous secondary battery reaches high temperature, the thermal contraction of the entire separator can be prevented satisfactorily, and the occurrence of a short-circuit caused by direct contact between the positive and negative electrodes can be prevented more satisfactorily.

When the inorganic filler having a heat resistant temperature of 150° C. or higher and the fine particles of the resin that does not melt at a temperature of 150° C. or lower are used in combination, it is appropriate that the combination of these mainly composes the porous layer (II). Specifically, the total amount of these with respect to the total volume of the constituent components of the porous layer (II) (total volume excluding pore parts) is 50 volume % or more, preferably 70 volume % or more, more preferably 80 volume % or more, and further preferably 90 volume % or more, and 99 volume % or less. Thus, it is possible to obtain the same effect as that in the case where the content of the inorganic filler in the porous layer (II) is high as described above.

The porous layer (II) preferably contains an organic binder in order to bind the fine particles of the resin that does not melt at a temperature of 150° C. or lower or the inorganic filler having a heat resistant temperature of 150° C. or higher, or to integrate the porous layer (II) and the porous layer (I). Examples of the organic binder include an ethylene-vinyl acetate copolymer (EVA containing a vinyl acetate-derived structural unit in an amount of 20 mol % or more and 35 mol % or less), an ethylene-acrylic acid copolymer such as an ethylene-ethyl acrylate copolymer, fluorine-based rubber, SBR, carboxymethylcellulose (CMC), hydroxyethyl cellulose (HEC), polyvinyl alcohol (PVA), polyvinyl butyral (PVB), polyvinyl pyrrolidone (PVP), crosslinked acrylic resin, polyurethane, and epoxy resin. In particular, a heat resistant binder having a heat resistant temperature of 150° C. or higher is preferably used. The organic binders listed above may be used alone or in a combination of two or more.

The coated and laminated type separator can be produced, for example, by applying a coating liquid for forming the porous layer (II) containing fine particles of the resin that does not melt at a temperature of 150° C. or less or the inorganic filler having a heat resistant temperature of 150° C. or more to the surface of a microporous film for constituting the porous layer (I) and drying it at predetermined temperature to form the porous layer (II).

The coating liquid for forming the porous layer (II) contains fine particles of the resin that does not melt at a temperature of 150° C. or less or the inorganic filler having a heat resistant temperature of 150° C. or more, and an organic binder as needed, in which these are dispersed in a solvent. The organic binder can also be dissolved in the solvent. As the solvent for use in the coating liquid for forming the porous layer (II), general organic solvents: for example, aromatic hydrocarbon such as toluene; furans such as tetrahydrofuran; and ketones such as methyl ethyl ketone and methyl isobutyl ketone are preferably used, as long as they are capable of uniformly dispersing the inorganic filler and the like, and are also capable of uniformly dissolving or dispersing the organic binder. Alcohols (ethylene glycol, propylene glycol, etc.) or various propylene oxide based glycol ether such as monomethyl acetate, etc. may be added as needed to the solvents for the purpose of controlling interfacial tension. Further, when the organic binder is water-soluble and used as an emulsion, water may be used as a solvent. In this case, alcohols (methyl alcohol, ethyl alcohol, isopropyl alcohol, ethylene glycol, etc.) can also be added as needed to control interfacial tension.

In the coating liquid for forming the porous layer (II), it is preferred that a solid content including fine particles of the resin that is not dissolved at a temperature of 150° C. or less or the inorganic filler having a heat resistant temperature of 150° C. or more, and the organic binder be, for example, 10 to 80 mass %.

In the laminated type separator, it is not required that the porous layer (I) and the porous layer (II) are respectively one layer, and a plurality of layers may be present in the separator. For example, the porous layer (I) may be disposed on both sides of the porous layer (II), or the porous layer (II) may be disposed on both sides of the porous layer (I). It should be noted that, when the number of layers is increased, the separator is thickened, which may increase the internal resistance of a battery or decrease the energy density; and hence it is not preferred to increase the number of layers excessively. The total number of layers of the porous layer (I) and the porous layer (II) in the laminated type separator is preferably 5 layers or less.

The thickness of the separator (separator formed of a microporous film made of polyolefin or the laminated type separator) of the non-aqueous secondary battery of the present invention is preferably 10 to 30 µm.

Further, in the laminated type separator, it is preferred that the thickness of the porous layer (II) [in the case where the separator includes a plurality of the porous layers (II), the thickness of the porous layer (II) refers to the total thickness thereof, which is also applied hereinafter] be 3 µm or more from the viewpoint of making the porous layer (II) exhibit each of the above functions more effectively. It should be noted that, when the porous layer (II) is too thick, there is a risk that the energy density of a battery may be decreased, and hence it is preferred that the thickness of the porous layer (II) be 8 µm or less.

Further, in the laminated type separator, the thickness of the porous layer (I) [in the case where the separator includes a plurality of the porous layers (I), the thickness of the porous layer (I) refers to the total thickness thereof, which is also applied hereinafter] is preferably 6 µm or more, more preferably 10 µm or more from the viewpoint of making the porous layer (I) exhibit the above functions (in particular, the shut-down function) more effectively. It should be noted that, when the porous layer (I) is too thick, the energy density of a battery may decrease, and in addition the force at which the porous layer (I) is thermally contracted increases, which may degrade the function of preventing the thermal contraction of the entire separator. Therefore, the thickness of the porous layer (I) is preferably 25 µm or less, more preferably 20 µm or less, and further preferably 14 µm or less.

It is preferred that the porosity of the entire separator be 30% or more in a dried state so as to render ion permeability satisfactory by ensuring a liquid retention amount of an electrolyte. On the other hand, it is preferred that the porosity of the separator be 70% or less in a dried state from the viewpoint of ensuring separator strength and preventing an internal short-circuit.

<Non-Aqueous Electrolyte>

As the non-aqueous electrolyte of the non-aqueous secondary battery of the present invention, a solution obtained by dissolving a lithium salt in a non-aqueous solvent is used.

The non-aqueous solvent of the non-aqueous electrolyte is preferably a combination of ethylene carbonate (EC) and ethylmethyl carbonate (EMC). The combined use of these allows an electrolyte to have better lithium ion conductivity and low viscosity, thereby increasing large current characteristics of a battery over a wide temperature range. Moreover, the combined use of EC and EMC can prevent the generation of gas inside a battery even when the battery is stored under a high temperature environment, thereby increasing storage characteristics of a battery. Further, the combined use of EC and EMC can increase charge and discharge cycle characteristics of a battery.

The content of EC is preferably 2.5 or more and 3.5 or less, and that of EMC is preferably 6.5 or more and 7.5 or less, where the total amount of the non-aqueous solvents of the non-aqueous electrolyte is assumed to be 10 on a volume basis. In other words, the content of EC is 25 volume % or more and 35 volume % or less, and that of EMC is 65 volume % or more and 75 volume % or less with respect to the total volume of the non-aqueous solvents. The use of EC and EMC in the above amounts can increase large current characteristics, storage characteristics, and charge and discharge cycle characteristics of a non-aqueous secondary battery over a wide temperature range.

Non-aqueous solvents other than EC and EMC may be used in combination with EC and EMC as the non-aqueous solvent of the non-aqueous electrolyte. Examples of other non-aqueous solvents that may be used in combination with EC and EMC include: cyclic carbonates such as propylene carbonate and butylene carbonate; chain carbonates such as dimethyl carbonate (DMC) and diethyl carbonate (DEC); chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxypropionitrile; and sulfurous esters such as ethylene glycol sulfite.

When the ratio of the non-aqueous solvents other than EC and EMC is too large in the non-aqueous solvents, the above effects through use of EC and EMC may decrease. Therefore, the total content of EC and EMC is 9.5 or more, where the total amount of the non-aqueous solvents is assumed to be 10 on a volume basis. In other words, the total content of EC and EMC is 95 volume % or more with respect to the total amount of the non-aqueous solvents. Therefore, when the non-aqueous solvents other than EC and EMC is used, the content thereof is adjusted so that the total content of EC and EMC satisfies the above value.

There is no particular limitation on the lithium salt of the non-aqueous electrolyte as long as it can dissociate in the non-aqueous solvent into lithium ion and tends not to cause a side reaction, such as decomposition, in a voltage range where batteries are used. Examples of the lithium salt include inorganic lithium salts such as $LiClO_4$, $LiPF_6$, $LiBF_4$, $LiAsF_6$, and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, and $LiC_nF_{2n+1}SO_3$ ($2 \leq n \leq 7$), $LiN(RfOSO_2)_2$ (where Rf is a fluoroalkyl group).

The concentration of the lithium salt in the non-aqueous electrolyte is preferably 0.5 to 1.5 mol/L, more preferably 0.9 to 1.25 mol/L.

It is preferred that the non-aqueous electrolyte to be used in the non-aqueous secondary battery of the present invention further contains cyclic sulfonate. The cyclic sulfonate to be used in the present invention is not particularly limited as long as part of the cyclic structure includes a sulfonate structure. Specific examples of the cyclic sulfonate to be used in the present invention include 1,3-propane sultone, 1,4-butane sultone, 2,4-butane sultone, and 1,3-butane sultone. Among these, 1,3-propane sultone is used preferably. In a battery, gas is produced by a reaction due to the contact between the positive electrode and the non-aqueous electrolyte. However, in a battery using a non-aqueous electrolyte containing cyclic sulfonate (in particular, 1,3-propane sultone), a film derived from the cyclic sulfonate is formed on the surface of the positive electrode through charge and discharge, and this film prevents the positive electrode from reacting with the non-aqueous electrolyte. Thus, storage characteristics of a battery can be enhanced further.

The content of the cyclic sulfonate in the non-aqueous electrolyte to be used in the non-aqueous secondary battery of the present invention is preferably 0.3 mass % or more from the viewpoint of satisfactorily ensuring the above effect through use of the cyclic sulfonate. When the amount of the cyclic sulfonate in the non-aqueous electrolyte is too large, a film to be formed on the surface of a positive electrode becomes too thick, which may increase resistance. Therefore, the content of 1,3-propane sultone in the non-aqueous electrolyte to be used in the non-aqueous secondary battery is preferably 3.0 mass % or less.

The non-aqueous electrolyte to be used in the non-aqueous secondary battery of the present invention preferably contains vinylene carbonate (VC). VC forms a film on the surface of a negative electrode through charge and discharge of a battery, and this film prevents the negative electrode from reacting with the non-aqueous electrolyte. Thus, charge and discharge cycle characteristics of a battery can be enhanced further.

The content of VC in the non-aqueous electrolyte to be used in the non-aqueous secondary battery of the present invention is preferably 1 mass % or more from the viewpoint of satisfactorily ensuring the above effect through the use of VC. However, since gas is produced when VC forms a film on the surface of a negative electrode, the effect of enhancing storage characteristics of a battery may decrease if the amount of VC in the non-aqueous electrolyte is too large. Therefore, the content of VC in the non-aqueous electrolyte to be used in the non-aqueous secondary battery is preferably 10 mass % or less.

The non-aqueous electrolyte may appropriately contain additives such as acid anhydride, sulfonate, dinitrile, diphenyl disulfide, cyclohexylbenzene, biphenyl, fluorobenzene, t-butylbenzene, and derivatives thereof, for the purpose of further improving charge and discharge cycle characteristics and storage characteristics, and enhancing safety (e.g., prevention of overcharge) of a battery.

Further, a gelled electrolyte obtained by adding a gelling agent such as a known polymer to the non-aqueous electrolyte may be used in the non-aqueous secondary battery of the present invention.

<Battery Form>

The form of the non-aqueous secondary battery of the present invention may be cylindrical (e.g., rectangular cylindrical or circular cylindrical) using a steel can or an aluminum can as an outer can. Further, the non-aqueous secondary battery of the present invention can also be of a soft package battery using a metal-evaporated laminated film as an outer body.

<Application of the Present Invention>

The non-aqueous secondary battery of the present invention is excellent in large current characteristics, storage characteristics, and charge and discharge cycle characteristics. By utilizing these characteristics, the non-aqueous secondary battery of the present invention can be favorably used for a power source of portable devices such as a portable telephone and various applications to which conventionally known non-aqueous secondary batteries such as a lithium-ion secondary battery are used.

EXAMPLES

Hereinafter, the present invention will be described in detail by way of examples. It should be noted, however, that the examples given below are not intended to limit the scope of the present invention.

<First Non-Aqueous Secondary Battery of the Present Invention>

The following describes the first non-aqueous secondary batteries of Examples A of the present invention and those of Comparative Examples A.

Example A1

<Production of Positive Electrode>

A positive electrode mixture containing slurry was prepared by mixing 47 parts by mass of $LiCoO_2$ (first positive electrode active material), 47 parts by mass of $Li_{1.0}Ni_{0.5}Co_{0.2}Mn_{0.3}O_2$ (second positive electrode active material), 4 parts by mass of acetylene black (conductive agent), 2 parts by mass of PVDF (binder), and dehydrated NMP (solvent).

Next, the positive electrode mixture containing slurry was applied to both sides of an aluminum foil (positive electrode current collector) having a thickness of 15 μm, which then was subjected to vacuum drying at 120° C. for 12 hours. Thus, positive electrode mixture layers were formed on the both sides of the aluminum foil. At the time of forming the positive electrode mixture layers, a portion of the aluminum foil was left uncoated and exposed. Then, the resultant aluminum foil was calendered to adjust the thickness and density of the positive electrode mixture layers, and cut so that the area of the positive electrode mixture layers was 65 mm×90 mm, and the exposed portion of the positive electrode current collector was contained. Thus, a positive electrode was obtained. Each of the positive electrode mixture layers of the positive electrode thus obtained had a thickness of 75 μm and a density of 3.1 g/cm³.

<Production of Negative Electrode>

SiO particles (D50: 5.0 μm) were heated to about 1000° C. in an ebullated bed reactor, and the heated SiO particles were brought into contact with a mixed gas of methane and nitrogen gas at 25° C. to carry out chemical vapor deposition (CVD) treatment for 60 minutes at 1000° C. The carbon produced by thermal decomposition of the mixed gas obtained in this manner (hereinafter also referred to as "CVD carbon") was deposited on the surfaces of the SiO particles to form a coating layer, and thereby a composite of SiO and carbon material (carbon-coated SiO) was obtained.

The composition ratio of the composite of SiO and carbon material was calculated from a change in the mass before and after the formation of the coating layer, which resulted in SiO:CVD carbon=85:15 (mass ratio).

Next, a negative electrode mixture containing slurry was prepared by mixing 5 parts by mass of the carbon-coated SiO and 93 parts by mass of graphite (which were negative electrode active materials), 1 part by mass of CMC and 1 part by mass of SBR (which were binders), and water (solvent).

The negative electrode mixture containing slurry was applied to both sides of a copper foil (negative electrode current collector) having a thickness of 10 μm, which then was subjected to vacuum drying at 120° C. for 12 hours. Thus, negative electrode mixture layers were formed on the both sides of the copper foil. At the time of forming the negative electrode mixture layers, a portion of the copper foil was left uncoated and exposed. Then, the resultant copper foil was calendered to adjust the thickness and density of the negative electrode mixture layers, and cut so that the area of the negative electrode mixture layers was 67 mm×92 mm, and the exposed portion of the negative electrode current collector was contained. Thus, a negative electrode was obtained. Each of the negative electrode mixture layers of the negative electrode thus obtained had a thickness of 100 μm and a density of 1.5 g/cm$^3$.

<Production of Separator>

A dispersion liquid was prepared by adding 5 kg of ion exchange water and 0.5 kg of a dispersant (aqueous solution of polycarboxylic acid ammonium salt at a concentration of 40 mass %) to 5 kg of boehmite having a D50 of 1 μm, and crushing the resultant mixture for 10 hours with a ball mill (internal volume: 20 L, rotation number: 40 times/min). The dispersion liquid thus obtained was subjected to vacuum drying at 120° C., which then was observed with a scanning electronic microscope (SEM). As a result, the boehmite had a substantially plate shape.

To 500 g of the dispersion liquid, 0.5 g of xanthan gum (thickener) and 17 g of a resin binder dispersion (binder) (45 mass % dispersion liquid of modified polybutyl acrylate) were added, and the mixture was stirred with a three-one motor for 3 hours to prepare a uniform slurry [slurry for forming the porous layer (II), solid content ratio: 50 mass %].

Next, one side of a PE macroporous separator for non-aqueous secondary battery [porous layer (I) having a thickness of 12 μm, a porosity of 40%, an average pore diameter of 0.08 μm, and a PE melting point of 135° C.] was subjected to corona discharge treatment (discharge amount: 40 W·min/m$^2$), and the slurry for forming the porous layer (II) was applied to the treated side using a microgravure coater. Then, the slurry for forming the porous layer (II) was dried to form a porous layer (II) having a thickness of 4 μm, whereby a laminated type separator was obtained. The mass per unit area of the porous layer (II) in the separator was 5.5 g/m$^2$, the volume content of boehmite thereof was 95 volume %, and the porosity thereof was 45%.

<Preparation of Non-Aqueous Electrolyte>

A non-aqueous electrolyte was prepared by dissolving LiPF$_6$ at a concentration of 1.2 mol/L in a mixed solvent containing EC and EMC at a volume ratio of 3:7.

<Assembly of Battery>

The 13 positive electrodes and 14 negative electrodes described above were laminated via the separators to form a laminated electrode body. In the laminated electrode body, the separators were arranged so that the porous layers (II) would be opposed to the positive electrodes.

Next, the laminated electrode body was sandwiched by two aluminum laminate films (95 mm×70 mm), and three sides of the laminate films arranged on and under the laminated electrode body were sealed by heating and subjected to vacuum drying at 60° C. for one day. Then, the non-aqueous electrolyte was injected therein from the remaining side of the laminate films. Then, the remaining side of the laminate films was sealed by vacuum heating. Thus, a non-aqueous secondary battery having an appearance of FIG. 2 and having a structure of FIG. 3 was obtained.

Figure 2:
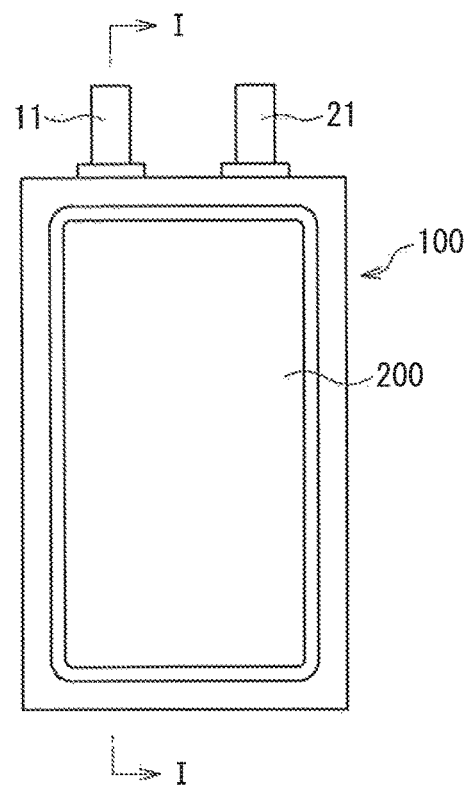
FIG. 2 is a plan view schematically showing an example of a non-aqueous secondary battery of the present invention.
Figure 3:
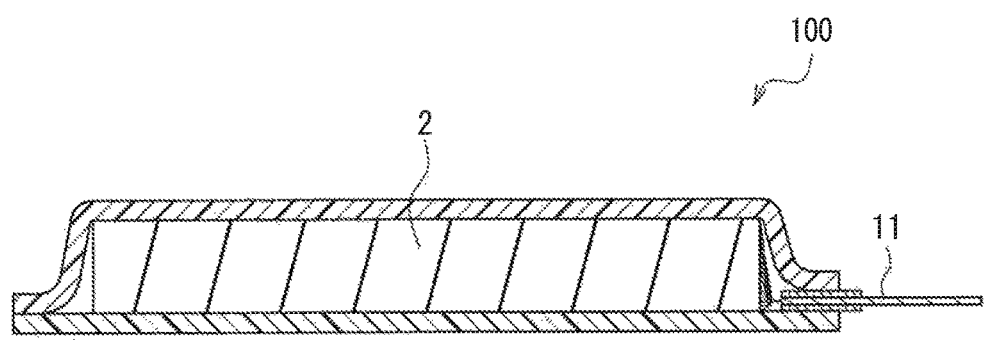
FIG. 3 is a cross-sectional view taken along a line I-I in FIG. 2.

The following describes FIGS. 2 and 3. FIG. 2 is a plan view schematically showing an example of a non-aqueous secondary battery of the present invention, and FIG. 3 is a cross-sectional view taken along a line I-I in FIG. 2. In FIGS. 2 and 3, in a non-aqueous secondary battery 100, an outer body 200 composed of two laminate films contains a laminated electrode body 2 and a non-aqueous electrolyte (not shown). The laminated electrode body 2 is composed of 13 positive electrodes and 14 negative electrodes laminated via separators. The outer body 200 is sealed by thermally fusing the outer circumference of the two opposing laminate films. In FIG. 3, for simplifying the drawing, the layers of the laminate films constituting the outer body 200, the positive and negative electrodes and the separators constituting the laminated electrode body 2 are not illustrated individually.

The positive electrodes constituting the laminated electrode body 2 are connected to a positive electrode external terminal 11 via a current collector tab in the non-aqueous secondary battery 100. Although not illustrated, the negative electrodes constituting the laminated electrode body 2 are also connected to a negative electrode external terminal 21 via a current collector tab in the non-aqueous secondary battery 100. Moreover, one end side of the positive electrode external terminal 11 and the negative electrode external terminal 21 is drawn to the outside of the outer body 200 so as to be connectable to, e.g., an external device.

Example A2

A positive electrode was produced in the same manner as in Example A1 except that the contents of LiCoO$_2$ and Li$_{1.0}$Ni$_{0.5}$Co$_{0.2}$Mn$_{0.3}$O$_2$ in a positive electrode mixture containing slurry were changed to 23.5 and 70.5 parts by mass, respectively, and a non-aqueous secondary battery was produced in the same manner as in Example A1 using the positive electrode.

Example A3

A positive electrode was produced in the same manner as in Example A1 except that the contents of LiCoO$_2$ and Li$_{1.0}$Ni$_{0.5}$Co$_{0.2}$Mn$_{0.3}$O$_2$ in a positive electrode mixture containing slurry were changed to 70.5 and 23.5 parts by mass, respectively, and a non-aqueous secondary battery was produced in the same manner as in Example A1 using this positive electrode.

Example A4

A positive electrode was produced in the same manner as in Example A1 except that the contents of LiCoO$_2$ and Li$_{1.0}$Ni$_{0.5}$Co$_{0.2}$Mn$_{0.3}$O$_2$ in a positive electrode mixture containing slurry were changed to 84.6 and 9.4 parts by mass, respectively, and a non-aqueous secondary battery was produced in the same manner as in Example A1 using this positive electrode.

Example A5

A negative electrode was produced in the same manner as in Example A1 except that the contents of carbon-coated SiO and graphite in a negative electrode mixture containing slurry were changed to 15 and 83 parts by mass, respectively, and a non-aqueous secondary battery was produced in the same manner as in Example A1 using this negative electrode.

Example A6

A positive electrode was produced in the same manner as in Example A1 except that the density of a positive electrode mixture layer was set to be 2.8 g/cm³, and a non-aqueous secondary battery was produced in the same manner as in Example A1 using this positive electrode.

Example A7

A positive electrode was produced in the same manner as in Example A1 except that $Li_{1.0}Ni_{0.6}Co_{0.2}Mn_{0.2}O_2$ instead of $Li_{1.0}Ni_{0.5}Co_{0.2}Mn_{0.3}O_2$ was used as a second positive electrode active material, and a non-aqueous secondary battery was produced in the same manner as in Example A1 using this positive electrode.

Comparative Example A1

A positive electrode was produced in the same manner as in Example A1 except that 94 parts by mass of only $Li_{1.0}Ni_{0.5}Co_{0.2}Mn_{0.3}O_2$ was used as a positive electrode active material, and a non-aqueous secondary battery was produced in the same manner as in Example A1 using this positive electrode.

Comparative Example A2

A positive electrode was produced in the same manner as in Example A1 except that the contents of $LiCoO_2$ and $Li_{1.0}Ni_{0.5}Co_{0.2}Mn_{0.3}O_2$ in a positive electrode mixture containing slurry were changed to 9.4 and 84.6 parts by mass, respectively, and a negative electrode was produced in the same manner as in Example A1 except that the contents of carbon-coated SiO and graphite in a negative electrode mixture containing slurry were changed to 2 and 96 parts by mass, respectively. A non-aqueous secondary battery was produced in the same manner as in Example A1 using these positive electrode and negative electrode.

Comparative Example A3

A positive electrode was produced in the same manner as in Example A1 except that 94 parts by mass of only $LiCoO_2$ was used as a positive electrode active material, and a negative electrode was produced in the same manner as in Example A1 except that the contents of carbon-coated SiO and graphite in a negative electrode mixture containing slurry were changed to 2 and 96 parts by mass, respectively. A non-aqueous secondary battery was produced in the same manner as in Example A1 using these positive electrode and negative electrode.

Comparative Example A4

A positive electrode was produced in the same manner as in Example A1 except that $Li_{1.0}Ni_{0.33}Co_{0.33}Mn_{0.33}O_2$ instead of $Li_{1.0}Ni_{0.5}Co_{0.2}Mn_{0.3}O_2$ was used as a second positive electrode active material, and a negative electrode was produced in the same manner as in Example A1 except that the contents of carbon-coated SiO and graphite in a negative electrode mixture containing slurry were changed to 2 and 96 parts by mass, respectively. A non-aqueous secondary battery was produced in the same manner as in Example A1 using these positive electrode and negative electrode.

Comparative Example A5

A negative electrode was produced in the same manner as in Example A1 except that 98 parts by mass of only graphite was used as a negative electrode active material, and a non-aqueous secondary battery was produced in the same manner as in Example A1 using this negative electrode.

Comparative Example A6

A positive electrode was produced in the same manner as in Example A1 except that the density of a positive electrode mixture layer was set to be 3.6 g/cm³, and a non-aqueous secondary battery was produced in the same manner as in Example A1 using this positive electrode.

Table 1 shows the configurations of the non-aqueous secondary batteries of Examples A1-A7 and Comparative Examples A1-A6. In Table 1, "Ratio between positive electrode active materials" refers to the mass ratio between the first positive electrode active material and the second positive electrode active material, and "Amount of carbon-coated SiO" refers to the ratio of the carbon-coated SiO to the total mass of the carbon-coated SiO and graphite.

TABLE 1

|  | First positive electrode active material | Second positive electrode active material | Ratio between electrode active materials | Density of positive electrode mixture layer (g/cm³) | Amount of carbon-coated SiO (%) | Density of negative electrode mixture layer (g/cm³) |
|---|---|---|---|---|---|---|
| Ex. A1 | $LiCoO_2$ | $Li_{1.0}Ni_{0.5}Co_{0.2}Mn_{0.3}O_2$ | 50:50 | 3.1 | 5 | 1.5 |
| Ex. A2 | Same as above | Same as above | 25:75 | 3.1 | 5 | 1.5 |
| Ex. A3 | Same as above | Same as above | 75:25 | 3.1 | 5 | 1.5 |
| Ex. A4 | Same as above | Same as above | 90:10 | 3.1 | 5 | 1.5 |
| Ex. A5 | Same as above | Same as above | 50:50 | 3.1 | 15 | 1.5 |
| Ex. A6 | Same as above | Same as above | 50:50 | 2.8 | 5 | 1.5 |
| Ex. A7 | Same as above | $Li_{1.0}Ni_{0.6}Co_{0.2}Mn_{0.2}O_2$ | 50:50 | 3.1 | 5 | 1.5 |
| Comp. Ex. A1 | — | $Li_{1.0}Ni_{0.5}Co_{0.2}Mn_{0.3}O_2$ | 0:100 | 3.1 | 5 | 1.5 |
| Comp. Ex. A2 | $LiCoO_2$ | Same as above | 10:90 | 3.1 | 2 | 1.5 |
| Comp. Ex. A3 | Same as above | — | 100:0 | 3.1 | 2 | 1.5 |
| Comp. Ex. A4 | Same as above | $Li_{1.0}Ni_{0.33}Co_{0.33}Mn_{0.33}O_2$ | 50:50 | 3.1 | 2 | 1.5 |
| Comp. Ex. A5 | Same as above | $Li_{1.0}Ni_{0.5}Co_{0.2}Mn_{0.3}O_2$ | 50:50 | 3.1 | 0 | 1.5 |
| Comp. Ex. A6 | Same as above | Same as above | 50:50 | 3.6 | 5 | 1.5 |

* Ex.: Example, Comp. Ex: Comparative Example

Next, the non-aqueous secondary batteries of Examples A1-A7 and Comparative Examples A1-A6 were evaluated for the following properties.

<Large Current Characteristics>

Each of the non-aqueous secondary batteries was subjected to constant current charging at a current of 1 C until the voltage reached 4.2 V at a temperature of 23° C., and further subjected to constant voltage charging at 4.2 V until the current reached 0.05 C. Thereafter, each battery was discharged at 15 C until the voltage reached 2.5 V to measure a discharge capacity at 15 C. Then, for each battery, the discharge capacity at 15 C thus measured was divided by the discharge capacity at 15 C of Example A1, and the obtained value was expressed in percentage. Thus, a capacity retention rate was obtained. A battery with a higher capacity retention rate has better large current characteristics.

<Charge and Discharge Cycle Characteristics>

Each of the non-aqueous secondary batteries was subjected to constant current charging at a current of 4 C at a temperature of 45° C. until the voltage reached 4.2 V, and further subjected to constant current discharging at a current of 4 C until the voltage reached 3.0 V. This series of operations was taken as one cycle, and 1000 cycles were performed. Then, for each battery, the discharge capacity at the 1000th cycle was divided by the discharge capacity at the 1000th cycle of Example A1, and the obtained value was expressed in percentage. Thus, a capacity retention rate was obtained. A battery with a higher capacity retention rate has better charge and discharge cycle characteristics.

<High Temperature Storage Characteristics>

Each of the non-aqueous secondary batteries was subjected to constant current charging at a current of 4 C until the voltage reached 4.2 V at a temperature of 23° C., and further subjected to constant voltage charging at 4.2 V until the current reached 0.05 C. Thereafter, each battery was stored in a thermostat maintained at 85° C. for four hours, and taken out from the thermostat to measure the thickness. The thickness of each battery after storage was divided by the thickness of the battery after storage of Example A1, and the obtained value was expressed in percentage. Thus, an expansion rate after storage of each battery was obtained. A battery with a smaller expansion rate has better high temperature storage characteristics.

Table 2 shows the results of the above evaluations.

TABLE 2

| | Large current characteristics Capacity retention rate (%) | Charge and discharge cycle characteristics Capacity retention rate (%) | High temperature storage characteristics Expansion rate (%) |
| --- | --- | --- | --- |
| Ex. A1 | 100 | 100 | 100 |
| Ex. A2 | 97 | 97 | 104 |
| Ex. A3 | 99 | 104 | 102 |
| Ex. A4 | 99 | 93 | 98 |
| Ex. A5 | 97 | 89 | 114 |
| Ex. A6 | 101 | 102 | 98 |
| Ex. A7 | 98 | 91 | 107 |
| Comp. Ex. A1 | 79 | 103 | 102 |
| Comp. Ex. A2 | 82 | 100 | 101 |
| Comp. Ex. A3 | 103 | 73 | 97 |
| Comp. Ex. A4 | 88 | 63 | 97 |
| Comp. Ex. A5 | 80 | 93 | 92 |
| Comp. Ex. A6 | 64 | 77 | 107 |

* Ex.: Example, Comp. Ex: Comparative Example

It is understood from Table 2 that the non-aqueous secondary batteries of Examples A1-A7 of the present invention were excellent in all of large current characteristics, charge and discharge cycle characteristics, and high temperature storage characteristics.

On the other hand, the battery of Comparative Example A1 not containing the first positive electrode active material ($LiCoO_2$) and the battery of Comparative Example A2 having a content of the first positive electrode active material ($LiCoO_2$) to all positive electrode active materials of less than 20 mass % had inferior large current characteristics. The battery of Comparative Example A3 not containing the second positive electrode active material ($Li_{1.0}Ni_{0.5}Co_{0.2}Mn_{0.3}O_2$) had inferior charge and discharge cycle characteristics. The battery of Comparative Example A4 using $Li_{1.0}Ni_{0.33}Co_{0.33}Mn_{0.33}O_2$ as the second positive electrode active material and the battery of Comparative Example A6 having a density of the positive electrode mixture layer of over 3.4 g/cm$^3$ had inferior large current characteristics and charge and discharge cycle characteristics. The battery of Comparative Example A5 not containing the carbon-coated SiO as a negative electrode active material had inferior large current characteristics and high temperature storage characteristics.

<Second Non-Aqueous Secondary Battery of the Present Invention>

Next, the following describes the second non-aqueous secondary batteries of Examples B of the present invention and those of Comparative Examples B.

Example B1

<Production of Positive Electrode>

A conductive layer forming slurry was prepared by mixing 89 parts by mass of acetylene black having an average particle diameter of 35 nm (conductive material), 10 parts by mass of PVDF (binder), 1 part by mass of polyvinyl pyrrolidone (dispersant), and 900 parts by mass of NMP (solvent).

Next, the conductive layer forming slurry was applied to both sides of an aluminum foil having a thickness of 20 μm and dried. Thus, a positive electrode current collector in which a conductive layer having a thickness of about 2 μm was formed on both sides of the aluminum foil was obtained. Here, the surface roughness Ra of the positive electrode current collector on the side on which the conductive layer was formed was 1.09 μm. A positive electrode was produced in the same manner as in Example A1 using this positive electrode current collector.

<Production of Negative Electrode>

A negative electrode mixture containing slurry was prepared by mixing 98 parts by mass of graphite having a number-average particle diameter of 20 μm (negative electrode active material), 1 part by mass of CMC and 1 part by mass of SBR (binders), and water. A negative electrode was produced in the same manner as in Example A1 using this negative electrode mixture containing slurry A non-aqueous secondary battery was produced in the same manner as in Example A1 using the above positive electrode and the above negative electrode.

Example B2

A positive electrode was produced in the same manner as in Example B1 except that the density of a positive electrode mixture layer was set to be 2.8 g/cm$^3$, and a non-aqueous secondary battery was produced in the same manner as in Example B1 using this positive electrode.

Example B3

A positive electrode was produced in the same manner as in Example B1 except that $Li_{1.0}Ni_{0.6}Co_{0.2}Mn_{0.2}O_2$ instead of $Li_{1.0}Ni_{0.5}Co_{0.2}Mn_{0.3}O_2$ was used as a second positive electrode active material, and a non-aqueous secondary battery was produced in the same manner as in Example B1 using this positive electrode.

Example B4

A positive electrode was produced in the same manner as in Example B1 except that the contents of $LiCoO_2$ and $Li_{1.0}Ni_{0.5}Co_{0.2}Mn_{0.3}O_2$ in a positive electrode mixture containing slurry were changed to 23.5 and 70.5 parts by mass, respectively, and a non-aqueous secondary battery was produced in the same manner as in Example B1 using this positive electrode.

Example B5

A positive electrode was produced in the same manner as in Example B1 except that the contents of $LiCoO_2$ and $Li_{1.0}Ni_{0.5}Co_{0.2}Mn_{0.3}O_2$ in a positive electrode mixture containing slurry were changed to 70.5 and 23.5 parts by mass, respectively, and a non-aqueous secondary battery was produced in the same manner as in Example B1 using this positive electrode.

Example B6

A positive electrode was produced in the same manner as in Example B1 except that the contents of $LiCoO_2$ and $Li_{1.0}Ni_{0.5}Co_{0.2}Mn_{0.3}O_2$ in a positive electrode mixture containing slurry were changed to 84.6 and 9.4 parts by mass, respectively, and a non-aqueous secondary battery was produced in the same manner as in Example B1 using this positive electrode.

Comparative Example B1

A positive electrode was produced in the same manner as in Example B1 except that a conductive layer was not formed in a positive electrode current collector, and a non-aqueous secondary battery was produced in the same manner as in Example B1 using this positive electrode.

Comparative Example B2

A positive electrode was produced in the same manner as in Example B1 except that 94 parts by mass of only $Li_{1.0}Ni_{0.5}Co_{0.2}Mn_{0.3}O_2$ was used as a positive electrode active material, and a non-aqueous secondary battery was produced in the same manner as in Example B1 using this positive electrode.

Comparative Example B3

A positive electrode was produced in the same manner as in Example B1 except that the contents of $LiCoO_2$ and $Li_{1.0}Ni_{0.5}Co_{0.2}Mn_{0.3}O_2$ in a positive electrode mixture containing slurry were changed to 9.4 and 84.6 parts by mass, respectively, and a non-aqueous secondary battery was produced in the same manner as in Example B1 using this positive electrode.

Comparative Example B4

A positive electrode was produced in the same manner as in Example B1 except that 94 parts by mass of only $LiCoO_2$ was used as a positive electrode active material, and a non-aqueous secondary battery was produced in the same manner as in Example B1 using this positive electrode.

Comparative Example B5

A positive electrode was produced in the same manner as in Example B1 except that $Li_{1.0}Ni_{0.33}Co_{0.33}Mn_{0.33}O_2$ instead of $Li_{1.0}Ni_{0.5}Co_{0.2}Mn_{0.3}O_2$ was used as a second positive electrode active material, and a non-aqueous secondary battery was produced in the same manner as in Example B1 using this positive electrode.

Comparative Example B6

A positive electrode was produced in the same manner as in Example B1 except that the density of a positive electrode mixture layer was set to be 3.6 g/cm³, and a non-aqueous secondary battery was produced in the same manner as in Example B1 using this positive electrode.

Table 3 shows the configurations of the non-aqueous secondary batteries of Examples B1-B6 and Comparative Examples B1-B6. In Table 3, "Ratio between positive electrode active materials" refers to the mass ratio between the first positive electrode active material and the second positive electrode active material.

TABLE 3

| | First positive electrode active material | Second positive electrode active material | Ratio between positive electrode active materials | Density of positive electrode mixture layer (g/cm³) | Presence or absence of conductive layer of positive electrode current collector | Density of negative electrode mixture layer (g/cm³) |
|---|---|---|---|---|---|---|
| Ex. B1 | $LiCoO_2$ | $Li_{1.0}Ni_{0.5}Co_{0.2}Mn_{0.3}O_2$ | 50:50 | 3.1 | Present | 1.5 |
| Ex. B2 | Same as above | Same as above | 50:50 | 2.8 | Present | 1.5 |
| Ex. B3 | Same as above | $Li_{1.0}Ni_{0.6}Co_{0.2}Mn_{0.2}O_2$ | 50:50 | 3.1 | Present | 1.5 |
| Ex. B4 | Same as above | $Li_{1.0}Ni_{0.5}Co_{0.2}Mn_{0.3}O_2$ | 25:75 | 3.1 | Present | 1.5 |
| Ex. B5 | Same as above | Same as above | 75:25 | 3.1 | Present | 1.5 |
| Ex. B6 | Same as above | Same as above | 90:10 | 3.1 | Present | 1.5 |
| Comp. Ex. B1 | Same as above | Same as above | 50:50 | 3.1 | Absent | 1.5 |
| Comp. Ex. B2 | — | Same as above | 0:100 | 3.1 | Present | 1.5 |
| Comp. Ex. B3 | $LiCoO_2$ | Same as above | 10:90 | 3.1 | Present | 1.5 |

TABLE 3-continued

|  | First positive electrode active material | Second positive electrode active material | Ratio between positive electrode active materials | Density of positive electrode mixture layer (g/cm³) | Presence or absence of conductive layer of positive electrode current collector | Density of negative electrode mixture layer (g/cm³) |
|---|---|---|---|---|---|---|
| Comp. Ex. B4 | Same as above | — | 100:0 | 3.1 | Present | 1.5 |
| Comp. Ex. B5 | Same as above | Li$_{1.0}$Ni$_{0.33}$Co$_{0.33}$Mn$_{0.33}$O$_2$ | 50:50 | 3.1 | Present | 1.5 |
| Comp. Ex. B6 | Same as above | Li$_{1.0}$Ni$_{0.5}$Co$_{0.2}$Mn$_{0.3}$O$_2$ | 50:50 | 3.6 | Present | 1.5 |

* Ex.: Example, Comp. Ex: Comparative Example

Next, the non-aqueous secondary batteries of Examples B1-B6 and Comparative Examples B1-B6 were evaluated for large current characteristics and charge and discharge cycle characteristics in the same manner as performed for the non-aqueous secondary batteries of Examples A1-A7 and Comparative Examples A1-A6 described above. Table 4 shows the results.

TABLE 4

|  | Large current characteristics Capacity retention rate (%) | Charge and discharge cycle characteristics Capacity retention rate (%) |
|---|---|---|
| Ex. B1 | 100 | 100 |
| Ex. B2 | 101 | 102 |
| Ex. B3 | 98 | 91 |
| Ex. B4 | 97 | 97 |
| Ex. B5 | 99 | 104 |
| Ex. B6 | 99 | 93 |
| Comp. Ex. B1 | 88 | 80 |
| Comp. Ex. B2 | 79 | 103 |
| Comp. Ex. B3 | 82 | 100 |
| Comp. Ex. B4 | 103 | 73 |
| Comp. Ex. B5 | 88 | 63 |
| Comp. Ex. B6 | 64 | 77 |

* Ex.: Example, Comp. Ex: Comparative Example

It is understood from Table 4 that the non-aqueous secondary batteries of Examples B1-B6 of the present invention were excellent in both of large current characteristics and charge and discharge cycle characteristics.

On the other hand, the battery of Comparative Example B1 not including a conductive layer in the positive electrode current collector, the battery of Comparative Example B5 using Li$_{1.0}$Ni$_{0.33}$Co$_{0.33}$Mn$_{0.33}$O$_2$ as a second positive electrode active material, and the battery of Comparative Example B6 having a density of the positive electrode mixture layer of over 3.4 g/cm³ had inferior large current characteristics and charge and discharge cycle characteristics. The battery of Comparative Example B2 not containing the first positive electrode active material (LiCoO$_2$) and the battery of Comparative Example B3 having a content of the first positive electrode active material (LiCoO$_2$) to all positive electrode active materials of less than 20 mass % had inferior large current characteristics. The battery of Comparative Example B4 not containing the second positive electrode active material (Li$_{1.0}$Ni$_{0.5}$Co$_{0.2}$Mn$_{0.3}$O$_2$) had inferior charge and discharge cycle characteristics.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

DESCRIPTION OF REFERENCE NUMERALS 1 wound electrode body
2 laminated electrode body
10 positive electrode current collector tab
11 positive electrode external terminal
20 negative electrode current collector tab
21 negative electrode external terminal
100 non-aqueous secondary battery
200 outer body

The invention claimed is:
1. A non-aqueous secondary battery comprising:
a positive electrode;
a negative electrode;
a non-aqueous electrolyte; and
a separator,
wherein the positive electrode includes a positive electrode mixture layer,
the positive electrode mixture layer contains a first positive electrode active material and a second positive electrode active material each composed of a lithium-containing composite oxide represented by General Composition Formula (1):

$$Li_{1+y}MO_2 \quad (1)$$

where y satisfies $-0.15 \leq y \leq 0.15$, and M represents a single element or an element group including at least one selected from Co, Ni, Ti, Cr, Fe, Cu, Zn, Al, Ge, Sn, Mg, Ag, Tl, Nb, B, P, Zr, Ca, Sr, Ba, Mo, Ga and Mn,
the first positive electrode active material contains Co, and satisfies $90 \leq a \leq 100$, where a (mol %) represents a ratio of Co to all elements constituting the M in General Composition Formula (1),
the second positive electrode active material contains Co, Ni and Mn, and satisfies $10 \leq b \leq 35$, $45 \leq c \leq 65$ and $10 \leq d \leq 35$, where b (mol %), c (mol %) and d (mol %) respectively represent ratios of Co, Ni and Mn to all elements constituting the M in General Composition Formula (1),
a ratio of the first positive electrode active material to all positive electrode active materials contained in the positive electrode mixture layer is 20 mass % or more and 90 mass % or less,
the positive electrode mixture layer has a density of 2.5 g/cm³ or more and 3.1 g/cm³ or less,
the negative electrode includes a negative electrode mixture layer, the negative electrode mixture layer contains, as negative electrode active materials, graphite and a material containing Si and O as constituent elements represented by General Composition Formula (2):

$$SiO_x \qquad (2)$$

where x satisfies $0.5 \leq x \leq 1.5$, and where the material containing Si and O as constituent elements is coated with a carbon material.

2. The non-aqueous secondary battery according to claim 1, wherein a ratio of the carbon-coated SiOx contained in the negative electrode mixture layer is 2 mass % or more and 20 mass % or less to a total mass of the graphite and carbon-coated SiOx.

3. The non-aqueous secondary battery according to claim 1, wherein a sum of a thickness of the positive electrode mixture layer and a thickness of the negative electrode mixture layer is 120 μm or more and 200 μm or less.

4. The non-aqueous secondary battery according to claim 1,
wherein the separator includes a porous layer (I) and a porous layer (II),
the porous layer (I) contains a resin having a melting point of 140° C. or lower, and
the porous layer (II) contains a resin that does not melt at a temperature of 150° C. or lower, or the porous layer (II) contains an inorganic filler that does not soften at least at 150° C.

* * * * *